(12) United States Patent
Ooishi et al.

(10) Patent No.: US 12,437,729 B2
(45) Date of Patent: Oct. 7, 2025

(54) DIMMING DEVICE, DISPLAY DEVICE, AND METHOD FOR DRIVING DIMMING DEVICE

(71) Applicant: Panasonic Automotive Systems Co., Ltd., Kanagawa (JP)

(72) Inventors: Yoshihisa Ooishi, Kanagawa Ken (JP); Koichi Itoh, Kanagawa Ken (JP); Koji Mimura, Kanagawa Ken (JP); Hideki Nozaki, Okayama Ken (JP); Ken Shiiba, Ishikawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 28 days.

(21) Appl. No.: 18/598,855

(22) Filed: Mar. 7, 2024

(65) Prior Publication Data

US 2024/0331651 A1    Oct. 3, 2024

(30) Foreign Application Priority Data

Mar. 29, 2023 (JP) .................................. 2023-052550
Sep. 22, 2023 (JP) .................................. 2023-158394

(51) Int. Cl.
  *G09G 3/36* (2006.01)
  *G02F 1/1343* (2006.01)
  *G02F 1/137* (2006.01)

(52) U.S. Cl.
  CPC ..... *G09G 3/3622* (2013.01); *G02F 1/134309* (2013.01); *G02F 1/137* (2013.01);
  (Continued)

(58) Field of Classification Search
  None
  See application file for complete search history.

(56) References Cited

U.S. PATENT DOCUMENTS 3,936,815 A * 2/1976 Kogure ............... G02F 1/13731
                                                    345/94
4,289,383 A * 9/1981 Schwarzschild ..... G09G 3/3622
                                                    349/68
(Continued)

FOREIGN PATENT DOCUMENTS

JP    2021-026222    2/2021
JP    2021-184062    12/2021

*Primary Examiner* — Patrick N Edouard
*Assistant Examiner* — Peijie Shen
(74) *Attorney, Agent, or Firm* — Greenblum & Bernstein, P.L.C.

(57) ABSTRACT

A dimming device according to the present disclosure includes a dimming panel. The dimming panel includes a dimming layer, a plurality of column electrodes, and a plurality of row electrodes. The dimming layer has a plurality of regions partitioned in a matrix. The column electrodes are arranged in a row direction along a front surface of the dimming layer. Each of the column electrodes extends in a column direction. The row electrodes face the column electrodes with the plurality of regions interposed therebetween and are arranged in the column direction along a back surface of the dimming layer. Each of the row electrodes extends in the row direction. Voltages having substantially the same waveform are supplied to a column electrode and a row electrode corresponding to a region of the regions controlled to a predetermined transmittance, among the column electrodes and the row electrodes.

14 Claims, 29 Drawing Sheets

(52) U.S. Cl.
CPC ... *G09G 3/3614* (2013.01); *G09G 2310/0278* (2013.01); *G09G 2310/065* (2013.01); *G09G 2320/0238* (2013.01); *G09G 2320/066* (2013.01); *G09G 2320/0686* (2013.01); *G09G 2354/00* (2013.01)

(56) References Cited

U.S. PATENT DOCUMENTS

| | | | | |
|---|---|---|---|---|
| 5,130,703 A | * | 7/1992 | Fairbanks | G09G 3/36 345/94 |
| 5,459,495 A | * | 10/1995 | Scheffer | G09G 3/2011 345/89 |
| 5,576,729 A | * | 11/1996 | Yamazaki | G09G 3/3614 345/94 |
| 5,861,869 A | * | 1/1999 | Scheffer | G09G 3/3625 345/691 |
| 5,877,738 A | * | 3/1999 | Ito | G09G 3/3681 345/94 |
| 5,900,856 A | * | 5/1999 | Iino | G09G 3/3692 345/100 |
| 5,963,189 A | * | 10/1999 | Ito | G09G 3/3625 345/100 |
| 6,600,467 B1 | * | 7/2003 | Webb | G02F 1/133617 345/87 |
| 2002/0033804 A1 | * | 3/2002 | Liang | H02M 3/07 345/173 |
| 2003/0034946 A1 | * | 2/2003 | Liang | G09G 3/2029 345/89 |
| 2004/0095307 A1 | * | 5/2004 | Kim | G09G 3/3622 345/96 |
| 2005/0156846 A1 | * | 7/2005 | Odake | G09G 3/3622 345/94 |
| 2006/0082559 A1 | * | 4/2006 | Louwsma | G09G 3/3625 345/204 |
| 2006/0132412 A1 | * | 6/2006 | Lienhard | G09G 3/3625 345/94 |
| 2006/0238469 A1 | * | 10/2006 | Johnson | G09G 3/3622 345/87 |
| 2018/0341132 A1 | * | 11/2018 | Suzuki | H10D 86/451 |

* cited by examiner

FIG.29
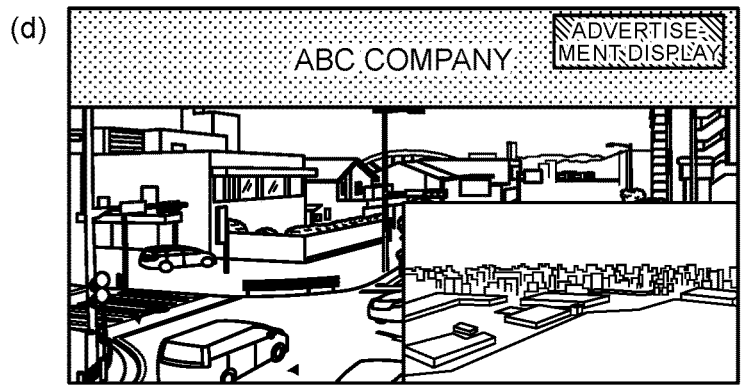
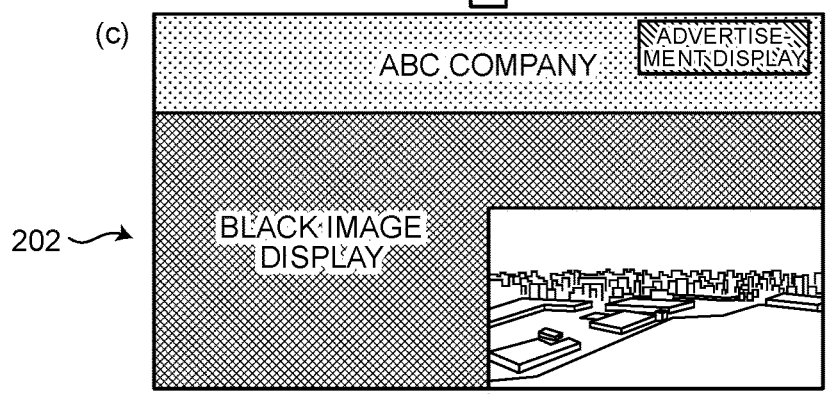
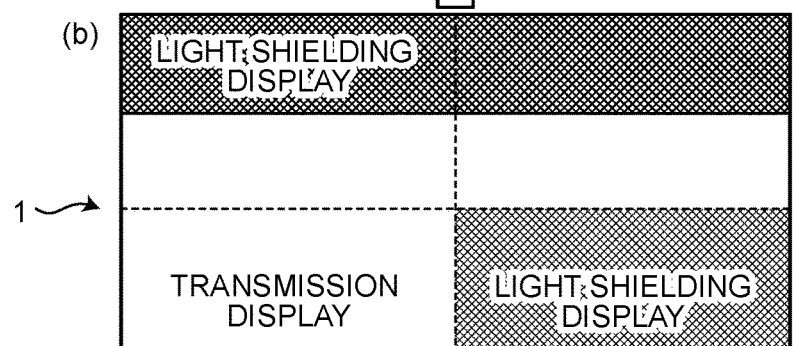
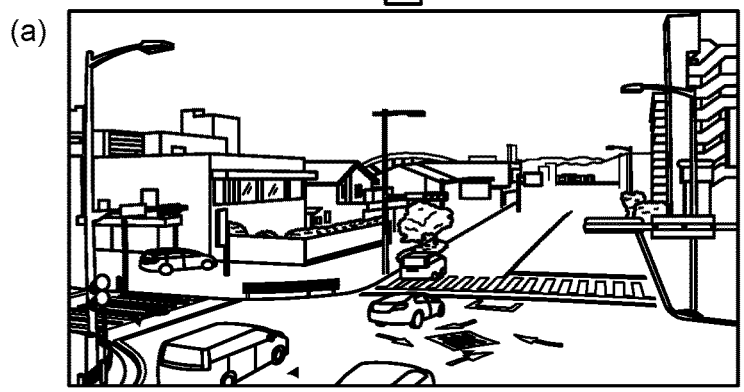

DIMMING DEVICE, DISPLAY DEVICE, AND METHOD FOR DRIVING DIMMING DEVICE

CROSS-REFERENCE TO RELATED APPLICATIONS

This application is based upon and claims the benefit of priority from Japanese Patent Application No. 2023-052550, filed on Mar. 29, 2023 and Japanese Patent Application No. 2023-158394, filed on Sep. 22, 2023, the entire contents of which are incorporated herein by reference.

FIELD

Embodiments described herein relate generally to a dimming device, a display device, and a method for driving the dimming device.

BACKGROUND

A dimming device can transmit or attenuate external light from a back surface. In the dimming device, it is desired to improve dimming performance. Conventional technologies are described in JP 2021-26222 A and JP 2021-184062 A, for example.

The present disclosure provides a dimming device, a display device, and a method for driving the dimming device capable of improving dimming performance.

SUMMARY

A dimming device according to an embodiment of the present disclosure includes a dimming panel. The dimming panel includes a dimming layer, a plurality of column electrodes, and a plurality of row electrodes. The dimming layer has a plurality of regions partitioned in a matrix. The plurality of column electrodes is arranged in a row direction along a front surface of the dimming layer, each of the column electrodes extending in a column direction. The plurality of row electrodes faces the plurality of column electrodes with the plurality of regions interposed therebetween and is arranged in the column direction along a back surface of the dimming layer, each of the row electrodes extending in the row direction. Voltages having substantially a same waveform are supplied to a column electrode and a row electrode corresponding to a region of the plurality of regions controlled to a predetermined transmittance, among the plurality of column electrodes and the plurality of row electrodes.

BRIEF DESCRIPTION OF THE DRAWINGS

FIG. 29 is a diagram illustrating an operation of the display device to which the dimming device according to the first to eighth embodiments is applied.

DETAILED DESCRIPTION

Hereinafter, embodiments of a dimming device according to the present disclosure will be described with reference to the accompanying drawings.

First Embodiment

Figure 1:
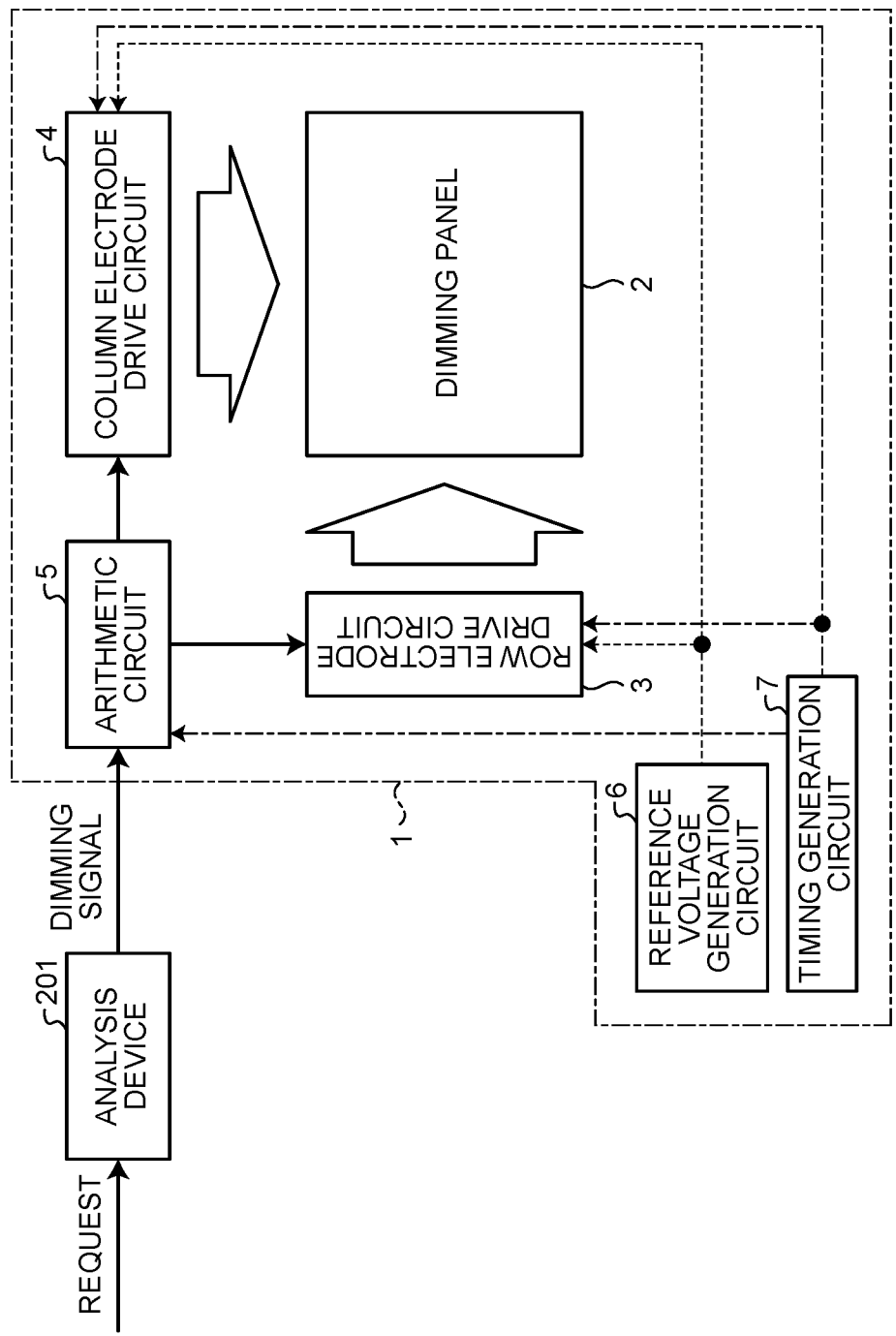
FIG. 1 is a block diagram illustrating a schematic configuration of a dimming device according to a first embodiment.

A dimming device according to a first embodiment can transmit or attenuate external light from a back surface, but is devised for improving the dimming performance. A dimming device 1 can be configured as illustrated in FIG. 1. FIG. 1 is a block diagram illustrating a configuration of the dimming device 1.

The dimming device 1 can two-dimensionally perform dimming to transmit or attenuate external light from the back surface.

In the present specification, a state in which the dimming device transmits external light is referred to as an on state, and a state in which the dimming device attenuates the external light is referred to as an off state.

Attenuating external light can also be referred to as shielding light. In addition, when a partial region of the dimming device is in a state of transmitting external light, the region is referred to as an on state. Similarly, when a partial region of the dimming device is in a state of attenuating external light, the region is referred to as an off state.

In the present specification, "electrically connected" between a first element and a second element includes that a third element is interposed and connected between the first element and the second element to the extent that functions of the first element and the second element are not hindered.

The dimming device 1 can be communicably connected to an analysis device 201. The analysis device 201 receives a request related to dimming from a host controller. The request may be, for example, an illuminance distribution or the like with respect to external light, or may be a request of a two-dimensional position of a region to be shielded from light. The analysis device 201 analyzes a request related to dimming, generates a dimming signal according to an analysis result, and supplies the dimming signal to the dimming device 1. The dimming device 1 has a plurality of regions to be dimmed, and it is possible to determine which one of a light-transmitting region and a light-shielding region is to be set for each of the plurality of regions according to the dimming signal.

The dimming device 1 includes a dimming panel 2, a row electrode drive circuit 3, a column electrode drive circuit 4, an arithmetic circuit 5, a reference voltage generation circuit 6, and a timing generation circuit 7.

Figure 2:
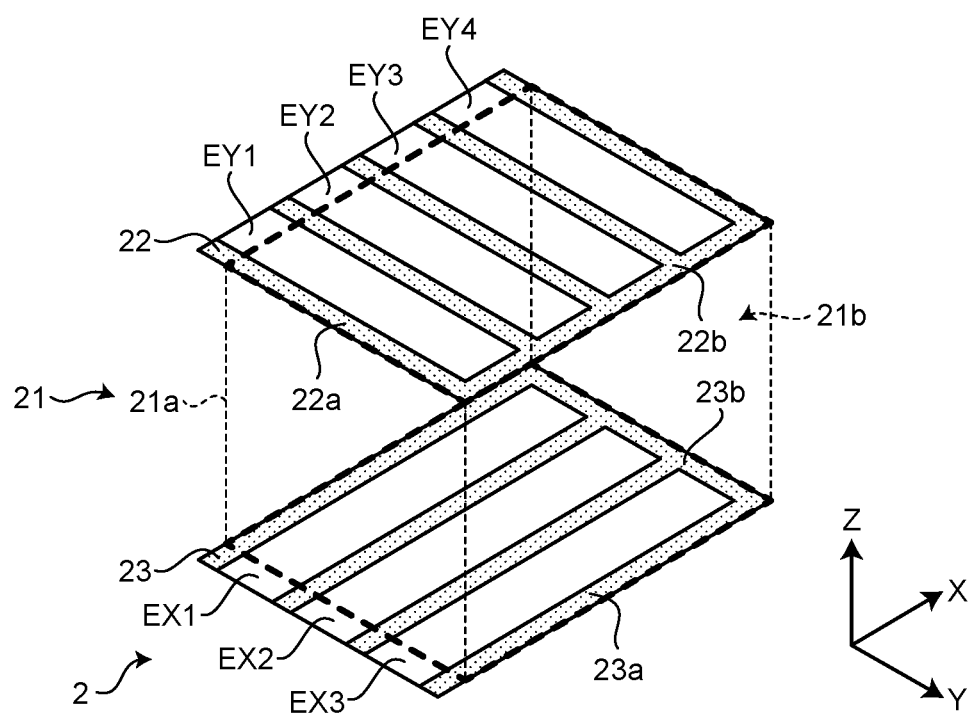
FIG. 2 is a perspective view illustrating a configuration of a dimming panel in the first embodiment.

As illustrated in FIG. 2, the dimming panel 2 includes a dimming layer 21, a plurality of column electrodes EY1 to EY4, and a plurality of row electrodes EX1 to EX3. FIG. 2 is a perspective view illustrating a configuration of the dimming panel 2.

The dimming layer 21 extends in a substantially plate shape in an XY direction. The dimming layer 21 may be configured such that a dimming liquid crystal 21b is sealed in a box-shaped member 21a. The dimming layer 21 has a front surface on a +Z side and a back surface on a −Z side. A +Z-side surface of the box-shaped member 21a may constitute the front surface of the dimming layer 21, and a −Z-side surface of the member 21a may constitute the back surface of the dimming layer 21.

The plurality of column electrodes EY1 to EY4 are arranged on the +Z side of the dimming layer 21. The plurality of column electrodes EY1 to EY4 may be disposed on a substrate 22 disposed on the front surface of the dimming layer 21. The substrate 22 may be bonded to the front surface of the dimming layer 21 via an adhesive or the like. The substrate 22 extends in a plate shape in the XY direction. Each of the column electrodes EY may be made of a transparent conductive material such as ITO. The substrate 22 may be formed of a transparent insulating resin or the like.

Figure 3A:
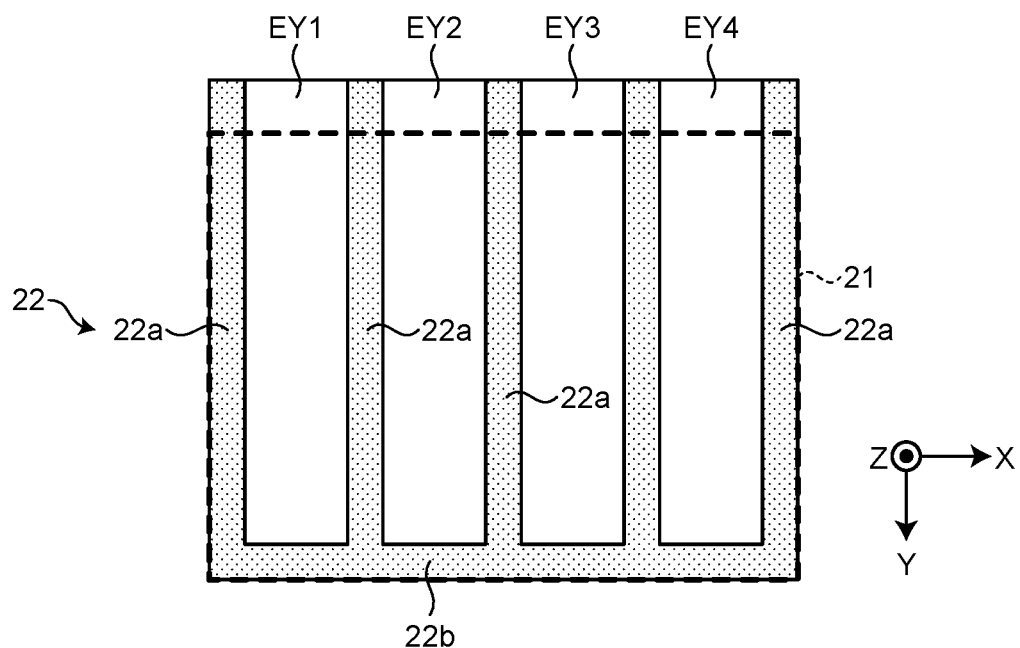
FIGS. 3A and 3B are views illustrating configurations of a column electrode and a row electrode in the first embodiment.

As illustrated in FIG. 3A, on the substrate 22, the plurality of column electrodes EY1 to EY4 are insulated from each other by an insulating portion 22a and an insulating portion 22b, and are arranged in the X direction. As a result, the plurality of column electrodes EY1 to EY4 are arranged in the X direction along the front surface of the dimming layer 21. On the substrate 22, each column electrode EY extends in a Y direction. The insulating portion 22a extends in the Y direction between the plurality of column electrodes EY1 to EY4. The insulating portion 22b extends in the X direction and connects +Y side end portions of the plurality of insulating portions 22a.

The plurality of row electrodes EX1 to EX3 illustrated in FIG. 2 is arranged on the −Z side of the dimming layer 21. The plurality of row electrodes EX1 to EX3 may be disposed on the substrate 23 disposed on the back surface of the dimming layer 21. The plurality of row electrodes EX1 to EX3 face the plurality of column electrodes EY1 to EY4 with the dimming layer 21 interposed therebetween. The substrate 23 may be bonded to the back surface of the dimming layer 21 via an adhesive or the like. The substrate 23 extends in a plate shape in the XY direction. Each row electrode EX may be formed of a transparent conductive material such as ITO. The substrate 23 may be formed of a transparent insulating resin or the like.

Figure 3B:
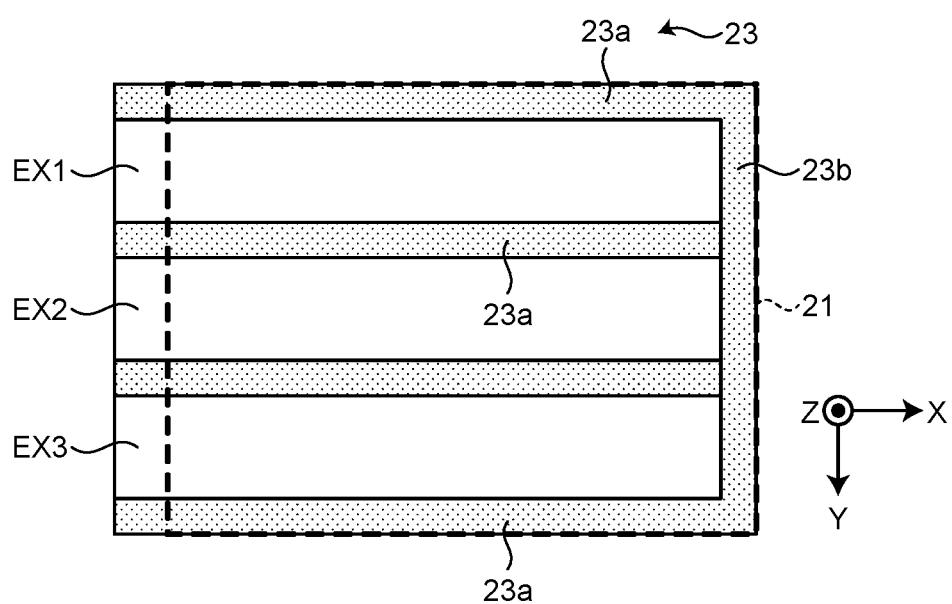

As illustrated in FIG. 3B, on the substrate 23, the plurality of row electrodes EX1 to EX3 are insulated from each other by an insulating portion 23a and an insulating portion 23b, and are arranged in the Y direction. As a result, the plurality of row electrodes EX1 to EX3 is arranged in the Y direction along the front surface of the dimming layer 21. On the substrate 23, each row electrode EX extends in the X direction. The insulating portion 23a extends in the X direction between the plurality of row electrodes EX1 to EX3. The insulating portion 23b extends in the Y direction and connects +X side end portions of the plurality of insulating portions 23a.

Figure 4:
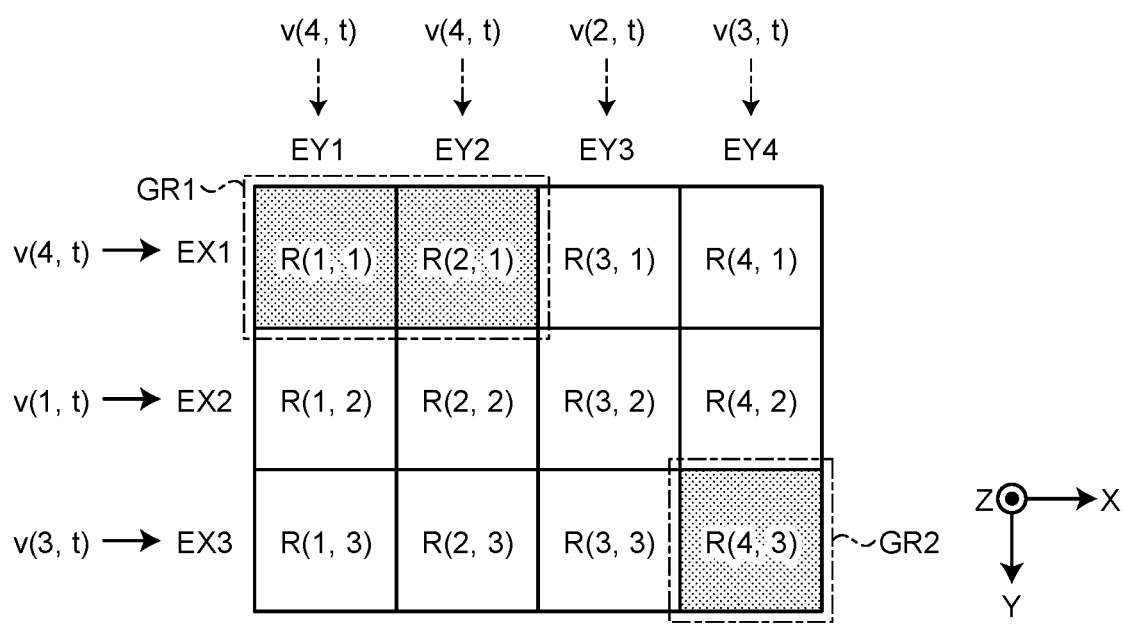
FIG. 4 is a plan view illustrating a plurality of regions partitioned by the dimming panel in the first embodiment.

In the dimming layer 21 illustrated in FIG. 2, a plurality of regions R(1,1) to R(4,3) as illustrated in FIG. 4 are partitioned at a plurality of intersection positions of the plurality of column electrodes EY1 to EY4 and the plurality of row electrodes EX1 to EX3. FIG. 4 is a plan view illustrating the plurality of regions R(1,1) to R(4,3) partitioned by the dimming panel 2.

The dimming layer 21 includes the plurality of regions R(1,1) to R(4,3) partitioned in a matrix. Each row extends in the X direction, and each column extends in the Y direction. The X direction may be referred to as a row direction, and the Y direction may be referred to as a column direction.

The region R(1,1) is formed in the dimming layer 21 at a position where the column electrode EY1 and the row electrode EX1 intersect when viewed from the Z direction. In the region R(1,1), a voltage is applied from the column electrode EY1 on the +Z side, and a voltage is applied from the row electrode EX1 on the −Z side.

The region R(2,1) is formed in the dimming layer 21 at a position where the column electrode EY2 and the row electrode EX1 intersect when viewed from the Z direction. In the region R(2,1), a voltage is applied from the column electrode EY2 on the +Z side, and a voltage is applied from the row electrode EX1 on the −Z side.

The region R(3,1) is formed in the dimming layer 21 at a position where the column electrode EY3 and the row electrode EX1 intersect when viewed from the Z direction. In the region R(3,1), a voltage is applied from the column electrode EY3 on the +Z side, and a voltage is applied from the row electrode EX1 on the −Z side.

The region R(4,1) is formed in the dimming layer 21 at a position where the column electrode EY4 and the row electrode EX1 intersect when viewed from the Z direction. In the region R(4,1), a voltage is applied from the column electrode EY4 on the +Z side, and a voltage is applied from the row electrode EX1 on the −Z side.

The region R(4,3) is formed in the dimming layer 21 at a position where the column electrode EY4 and the row electrode EX3 intersect when viewed from the Z direction. In the region R(4,3), a voltage is applied from the column electrode EY4 on the +Z side, and a voltage is applied from the row electrode EX3 on the −Z side.

The reference voltage generation circuit 6 illustrated in FIG. 1 is electrically connected to the row electrode drive circuit 3 and the column electrode drive circuit 4. The reference voltage generation circuit 6 generates a reference voltage. The reference voltage generation circuit 6 may generate a first reference voltage and a second reference voltage. The first reference voltage includes a voltage of a voltage level +1 to be described later. The second reference voltage includes a voltage of a voltage level −1 described later. The reference voltage generation circuit 6 may generate the reference voltage using a band gap voltage (for example, forward voltage of diode) according to a band gap energy of a semiconductor. The reference voltage generation circuit 6 supplies the reference voltage to the row electrode drive circuit 3 and the column electrode drive circuit 4. The reference voltage generation circuit 6 may supply the first reference voltage and the second reference voltage to the row electrode drive circuit 3 and the column electrode drive circuit 4, respectively.

The timing generation circuit 7 is electrically connected to the arithmetic circuit 5, the row electrode drive circuit 3, and the column electrode drive circuit 4. The timing generation circuit 7 generates a clock signal. The timing generation circuit 7 may generate the clock signal using a reference clock signal from an oscillator. The timing generation circuit 7 supplies the clock signal to each of the arithmetic circuit 5, the row electrode drive circuit 3, and the column electrode drive circuit 4.

The arithmetic circuit 5 is electrically connected between the analysis device 201 and the row electrode drive circuit 3 and the column electrode drive circuit 4. The arithmetic circuit 5 receives the dimming signal from the analysis device 201. In the dimming device 1, a plurality of candidate voltage waveforms is set in advance. The plurality of candidate voltage waveforms may be set in advance in each of the arithmetic circuit 5, the row electrode drive circuit 3, and the column electrode drive circuit 4. The dimming signal includes an instruction to designate a candidate voltage waveform to be supplied to the plurality of column electrodes EY1 to EY4 among the plurality of candidate voltage waveforms and an instruction to designate a candidate voltage waveform to be supplied to the plurality of row electrodes EX1 to EX3. In synchronization with the clock signal, the arithmetic circuit 5 generates a column control signal corresponding to the dimming signal and supplies the column control signal to the column electrode drive circuit 4, and generates a row control signal corresponding to the dimming signal and supplies the row control signal to the row electrode drive circuit 3. The column control signal includes an instruction of a voltage waveform to be supplied to each column electrode EY. The row control signal includes an indication of a voltage waveform to be supplied to each row electrode EX.

The column electrode drive circuit 4 is electrically connected to the plurality of column electrodes EY1 to EY4. The column electrode drive circuit 4 drives each of the plurality of column electrodes EY1 to EY4 with a voltage waveform corresponding to the column control signal using the reference voltage in synchronization with the clock signal. The column electrode drive circuit 4 can individually drive the plurality of column electrodes EY1 to EY4. The column electrode drive circuit 4 selects one of the first reference voltage and the second reference voltage according to the column control signal. The column electrode drive circuit 4 can supply the selected reference voltage to the column electrodes EY1 to EY4 in synchronization with the clock signal.

The row electrode drive circuit 3 is electrically connected to the plurality of row electrodes EX1 to EX3. The row electrode drive circuit 3 drives each of the plurality of row electrodes EX1 to EX3 with a voltage waveform corresponding to the row control signal using the reference voltage in synchronization with the clock signal. The row electrode drive circuit 3 can individually drive the plurality of row electrodes EX1 to EX3. The row electrode drive circuit 3 selects one of the first reference voltage and the second reference voltage according to the row control signal. The row electrode drive circuit 3 can supply the selected reference voltage to the row electrodes EX1 to EX3 in synchronization with the clock signal.

For example, a display that displays an image is required to have a high contrast ratio, and super twisted nematic (STN) liquid crystal that is used together with a polarizing plate and can secure a contrast ratio can be used.

Meanwhile, in the dimming device 1, it is useful to obtain high transmittance in an on state in which external light is transmitted. Therefore, for the dimming layer 21 of the dimming panel 2, the dimming liquid crystal 21b that does not require a polarizing plate and can secure high transmittance can be used. The dimming liquid crystal 21b includes a guest host (GH) liquid crystal. The GH liquid crystal may be a liquid crystal in which a dichroic pigment is added to a twisted liquid crystal material. The dichroic pigment is a pigment having anisotropy in absorption characteristics.

Figure 5:
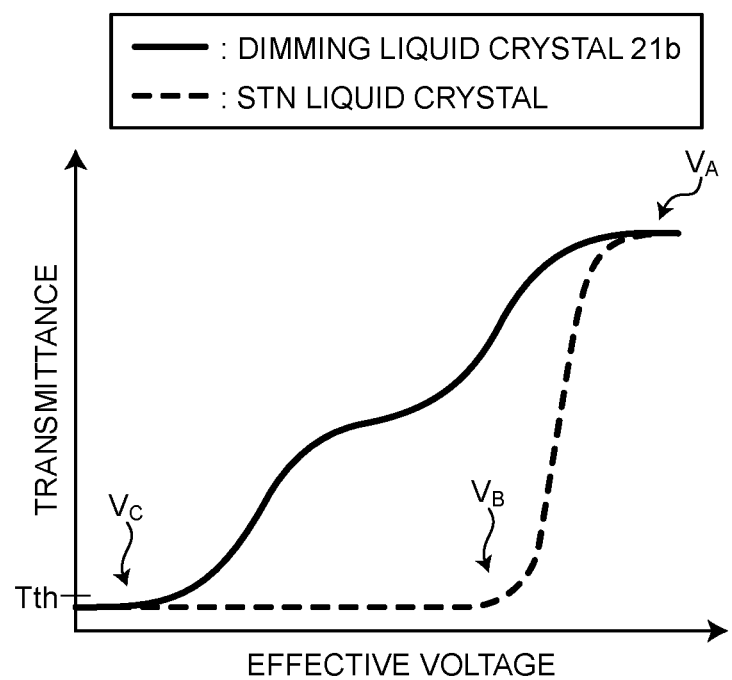
FIG. 5 is a diagram illustrating characteristics of a dimming liquid crystal in the first embodiment.

For example, for each of the dimming liquid crystal (for example, GH liquid crystal) 21b and the STN liquid crystal, the change characteristic of the transmittance with respect to the applied voltage is as illustrated in FIG. 5. In FIG. 5, a vertical axis represents the magnitude of the transmittance, and a relative value in a case where the transmittances in the on state are equal to each other is illustrated. A horizontal axis indicates the magnitude of the effective voltage applied to the liquid crystal.

In FIG. 5, the change characteristic in a case where the dimming liquid crystal 21b is the GH liquid crystal is indicated by a solid line, and the change characteristic of the STN liquid crystal is indicated by a dotted line as a comparative example. An example of a normally black mode in which the transmittance is low when the effective voltage is low is illustrated in the change characteristics of both the dimming liquid crystal 21b and the STN liquid crystal.

In the dimming liquid crystal 21b, the transmittance changes more smoothly than the STN liquid crystal with respect to the applied effective voltage. For example, the minimum applied voltage at which the transmittance becomes substantially the maximum value, that is, the ON voltage is set as a voltage $V_A$ in all the liquid crystal materials. The maximum applied voltage at which the transmittance is smaller than a threshold value Tth, that is, an OFF voltage is a voltage $V_B$ slightly lower than the voltage $V_A$ in the STN liquid crystal. Meanwhile, in the GH liquid crystal, a voltage $V_C$ is significantly lower than the voltage $V_A$. As a result, a relationship of an ON/OFF ratio with respect to each liquid crystal material is expressed by the following Mathematical Formula (1).

$$V_A/V_C \gg V_A/V_B \quad (1)$$

As illustrated in Mathematical Formula (1), the GH liquid crystal having a gentle transmittance/effective voltage characteristic requires a higher ON/OFF ratio than the STN liquid crystal. When the conventional driving system is used, it is difficult to realize a high ON/OFF ratio. Details will be described below.

In a display using STN liquid crystal, for example, a liquid crystal layer is provided by being sandwiched between two substrates of a substrate having a plurality of row electrodes and a substrate facing the substrate and having a plurality of column electrodes. A pixel is formed at a position where the plurality of row electrodes and the plurality of column electrodes intersect.

The display using the STN liquid crystal is driven by, for example, a voltage supply system by a passive matrix drive system. In the passive matrix drive system, for example, in a certain period, the voltage V=1 is applied to one row electrode, and the voltage V=0 is applied to the other row electrodes. This is repeated by changing the row electrode to which the voltage V=1 is applied until the voltage V=1 is applied to all the row electrodes.

In a case where the number of row electrodes is N, when a length of a period during which the voltage V=1 is applied to one row electrode is 1, the length of the period (referred to as a frame period) required for applying the voltage V=1 to all the row electrodes is N.

In addition, a voltage V=±y (y>0) including a binary voltage level is applied to the column electrode.

As described above, in general, in the passive matrix drive system, the voltage applied to the row electrode and the voltage applied to the column electrode are different. A voltage corresponding to a potential difference between the row electrode and the column electrode is applied to a liquid crystal layer at a position corresponding to each pixel, and an effective value Vrms thereof is two values expressed by the following Mathematical Formula (2).

$$V\text{rms} = (N \cdot y^2 \pm 2y + 1)^{0.5} \quad (2)$$

At this time, an ON/OFF ratio that is a ratio between the ON voltage Von and the OFF voltage Voff is a value expressed by the following Mathematical Formula (3).

$$\frac{V\text{on}}{V\text{off}} = \left(\frac{N \cdot y^2 + 2y + 1}{N \cdot y^2 - 2y + 1}\right)^{0.5} \quad (3)$$

This value is maximized when the relationship illustrated in the following Mathematical Formula (4) is satisfied.

$$\frac{\langle V\text{on} \rangle}{\langle V\text{off} \rangle} = \left(\frac{N^{0.5}+1}{N^{0.5}-1}\right)^{0.5} \quad (4)$$

In Mathematical Formula (4), Von represents the ON voltage. The ON voltage is an effective value of a potential difference provided on both sides of the region R in the Z direction to turn on the region R. Voff represents the OFF voltage. The OFF voltage is an effective value of a potential difference provided on both sides of the region R in the Z direction in order to bring the region R into an off state. N is the number of rows in the plurality of regions R(1,1) to R(4,3) partitioned by the dimming panel 2, and corresponds to the number of row electrodes EX1 to EX3.

The passive matrix drive system includes a voltage averaging method, a multi-line selection method, and the like, and the maximum value of the ON/OFF ratio is the same in any method.

In the passive matrix drive system, both the ON voltage and the OFF voltage tend to have relatively close effective voltages. In this driving system, as illustrated in Mathematical Formula (3) and Mathematical Formula (4), it is difficult to obtain dimming performance required for GH liquid crystal.

For example, when the ON voltage $V_A$ at the time of transmission is secured, the voltage applied to the liquid crystal may approach the voltage $V_B$ even when the scanning lines are about several lines. As a result, the transmittance increases due to the OFF voltage at the time of light shielding, and there is a possibility that required light shielding performance cannot be obtained. In the case of FIGS. 2 to 4, the number of rows N, which is the number of scanning lines, is 3. At this time, the theoretical maximum value of the ON/OFF ratio in the conventional passive matrix drive system is about 1.96 according to Mathematical Formula (4). That is, the OFF voltage is about half the ON voltage. The on/off ratio required in STN liquid crystals is generally less than 1.1, well below 1.96. Meanwhile, a desirable on/off ratio in the dimming liquid crystal is generally more than 10. Therefore, in the passive matrix drive system, it is difficult to individually turn on and off the plurality of regions R(1,1) to R(4,3) in the dimming layer 21.

Therefore, in the present embodiment, the dimming device 1 drives the dimming panel 2 by a new driving system according to the following procedures (1) to (4). The analysis device 201 performs the operations of procedure (1) to procedure (4), generates a dimming signal corresponding to procedure (1) to procedure (4), and supplies the dimming signal to the dimming device 1. As described above, the dimming device 1 can individually turn on and off the plurality of regions R(1,1) to R(4,3) in the dimming panel 2 according to the dimming signal according to the procedure (1) to the procedure (4):

(1) A voltage waveform in which an average value, an effective value, and a product-sum operation result between different waveforms are equal to each other is prepared;

(2) Among the plurality of regions R(1,1) to R(4,3) in the dimming layer 21, regions (that is, region where the transmittance should be equal to or less than the threshold value Tth) to be turned off are grouped by regions having a common row or column to form a light-shielding group;

(3) In each region R in the same light-shielding group, substantially the same voltage waveform is supplied to the corresponding column electrode EY and row electrode EX. Different voltage waveforms are supplied to different light-shielding groups; and (4) For the region R that does not belong to any light-shielding group, the voltage waveform that is not allocated in the procedure (3) and is different between the row and the column is allocated.

In the procedure (1), P types of different voltage waveforms v(p,t) are prepared as candidate voltage waveforms. p is an integer of 1 or more and P or less, and p=1, 2, ..., P. t represents a time equal to or more than 0 and smaller than the frame period T of the waveform, and 0≤t<T holds. T is the frame period, and may be a least common multiple with respect to a cycle of a plurality of voltage waveforms v(p,t). Each voltage waveform v(p,t) satisfies the following Mathematical Formula (5) and Mathematical Formula (6) for the frame period T.

$$\int_0^T v(p,t)dt = A \quad (5)$$

$$\int_0^T (v(p,t) \cdot v(q,t))dt = \begin{cases} B & (p=q) \\ C & (p \neq q) \end{cases} \quad (6)$$

In Mathematical Formula (5) and Mathematical Formula (6), A, B, and C are constants, respectively, and B>0 and B>C are satisfied. The frame period T includes a plurality of subframe periods. The number of subframe periods included in the frame period T can be determined as the number that satisfies Mathematical Formula (5) and Mathematical Formula (6).

In the procedure (2), the light-shielding regions having a common row or column are grouped as a light-shielding group with respect to the dimming layer 21 partitioned by a plurality of regions R of a matrix (M,N) of N rows and M columns. However, when the number of grouped rows is n and the number of columns is m, the number of light-shielding regions is m×n. The light-shielding group does not include the light-transmitting region. The number of light-shielding groups is an integer less than or equal to Min (M,N), which is the smaller value of N and M. The number of types P of the voltage waveform may be an integer corresponding to Max (M,N) which is a larger value of N and M.

The procedure (3) includes a procedure (3-1) and procedure (3-2).

In the procedure (3-1), one type of voltage waveform among the P types of different voltage waveforms v(p,t) is assigned to the matrix of the same light-shielding group. When the light-shielding groups are different, voltage waveforms of different types (subscript p is different) are assigned.

In the procedure (3-2), a voltage waveform that is not allocated in the procedure (3-1) and is different in rows and columns is allocated to a matrix that does not belong to any light-shielding group.

In a case where the above is applied, the average voltage applied to the plurality of regions R(i,j) (for example, i=1 to 4, j=1 to 3, and i and j are each integers) in the dimming layer 21 becomes 0 as illustrated in the following Mathematical Formula (7).

$$Vavg(i,j) = \frac{1}{T}\int_0^T (y(j,t) - x(i,t))dt = 0 \quad (7)$$

As illustrated in Mathematical Formula (7), when viewed in time average, no DC component is applied to the dimming layer 21, and stable dimming can be expected.

In addition, the effective voltage becomes zero in the light-shielding region corresponding to p=q, and becomes a positive value √{2(B−C)/T} in the light-transmitting region corresponding to p≠q, as illustrated in the following Mathematical Formula (8).

$$Vrms(i,j) = \sqrt{\frac{1}{T}\int_0^T (y(j,t) - x(i,t))^2 dt} = \sqrt{\frac{1}{T}\int_0^T (v(p,t) - v(q,t))^2 dt} = \sqrt{\frac{1}{T}\int_0^T (v(p,t)^2 + v(q,t)^2 - 2v(p,t)\cdot v(q,t))dt} = \begin{cases} 0 & (p=q) \\ \sqrt{\frac{2}{T}(B-C)} & (p \neq q) \end{cases} \quad (8)$$

That is, since there is no constraint of Mathematical Formula (4), in the dimming layer 21, the voltage applied to the region R to be shielded from light can be set to a value (for example, less than $V_C$ in FIG. 5) theoretically 0 and actually close to 0, and the voltage applied to the region R to be transmitted through light can be set to an appropriate positive value (for example, $V_A$ or more in FIG. 5).

As a result, it is possible to obtain light shielding performance required for the region R to be shielded from light while individually controlling the plurality of regions R. That is, in the plurality of regions R, the light-transmitting region and the light-shielding region can be combined with a high degree of freedom.

For example, when each region is represented by (column number, row number) with respect to the region R of four columns and three rows, dimming is considered in which the region R(1,1), the region R(2,1), and the region R(4,3) are light-shielding regions, and the other regions are light-transmitting regions as illustrated in FIG. 4.

Figure 6:
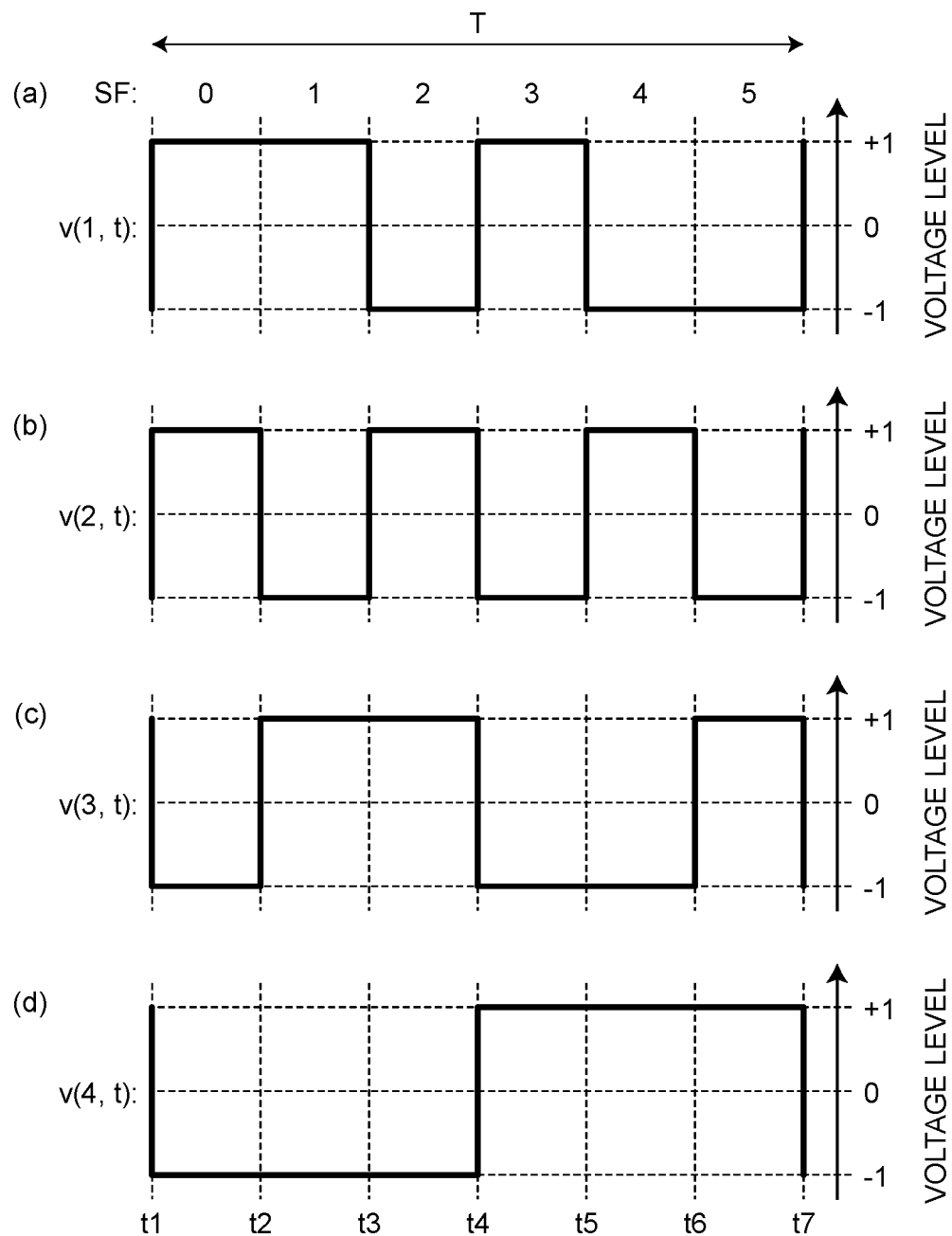
FIG. 6 is a waveform diagram illustrating voltage waveforms to be supplied to a column electrode and a row electrode in the first embodiment.

At this time, a voltage waveform as illustrated in FIG. 6 is considered. In FIGS. 6(a) to 6(d), the type of the voltage waveform is P=4, and the frame period T=6×(subframe period SF). Numbers of the six subframe periods SF are indicated by 0 to 5. The frame period T is a period from timing t1 to timing t7. The subframe period SF0 is a period from timing t1 to timing t2. The subframe period SF1 is a period from timing t2 to timing t3. The subframe period SF2 is a period from timing t3 to timing t4. The subframe period SF3 is a period from timing t4 to timing t5. The subframe period SF4 is a period from timing t5 to timing t6. The subframe period SF5 is a period from timing t6 to timing t7.

FIGS. 6(a) to 6(d) are waveform diagrams illustrating voltage waveforms to be supplied to the column electrode and the row electrode. In each of the voltage waveform v(1,t) to the voltage waveform v(4,t) in FIGS. 6(a) to 6(d), a vertical axis represents a voltage level and a horizontal axis represents time. In the voltage level, a reference voltage level is indicated by 0, a positive voltage level is indicated by +1, and a negative voltage level is indicated by −1.

In each of the voltage waveform v(1,t) to the voltage waveform v(4,t), the amplitude is (+1)−(−1)=2, Mathematical Formula (5) and Mathematical Formula (6) are satisfied, and the procedure (1) is met.

That is, the voltage waveform v(1,t) to the voltage waveform v(4,t) have a point-symmetrical waveform with respect to an intersection of the timing t4 and the voltage level 0, and an amplitude time-averaged within one frame period T becomes zero, so that A=0 (average value) illustrated in Mathematical Formula (5) is satisfied.

The product v(p,t)·v(q,t) of the two voltage waveforms becomes B=6 illustrated in Mathematical Formula (6) when p=q. For example, when the sum of products of the same two voltage waveforms is obtained for the subframe periods SF0 to SF5, v(1,t)·v(1,t)=+1+1+1+1+1+1=6.

The product v(p,t)·v(q,t) of the two voltage waveforms becomes C=−2 illustrated in Mathematical Formula (6) when p≠q. For example, when the sum of products of two different voltage waveforms for the subframe periods SF0 to SF5 is obtained, v(1,t)·v(2,t)=+1−1−1−1−1+1=−2 is obtained.

In a case where grouping is performed in the light-shielding region having a common row or column on the basis of the procedure (2), as illustrated in FIG. 4, one light-shielding group GR1 is formed in two regions of the region R(1,1) and the region R(1,2), and one light-shielding group GR2 is formed in one region of the region R(4,3).

On the basis of the procedure (3-1), for example, the voltage waveform v(4,t) is assigned to the column electrodes EY1 and EY2 and the row electrode EX1 corresponding to the light-shielding group GR1. A voltage waveform different from the voltage waveform v(4,t) is assigned to the column electrode EY4 and the row electrode EX3 corresponding to the light-shielding group GR2. For example, a voltage waveform v(3,t) is assigned to the column electrode EY4 and the row electrode EX3.

On the basis of the procedure (3-2), voltage waveforms different from the voltage waveform v(3,t) and the voltage waveform v(4,t) are assigned to the column electrode EY3 and the row electrode EX2 that do not correspond to the light-shielding region. For example, the voltage waveform v(2,t) is assigned to the column electrode EY3, and the voltage waveform v(1,t) is assigned to the row electrode X2.

Figure 7:
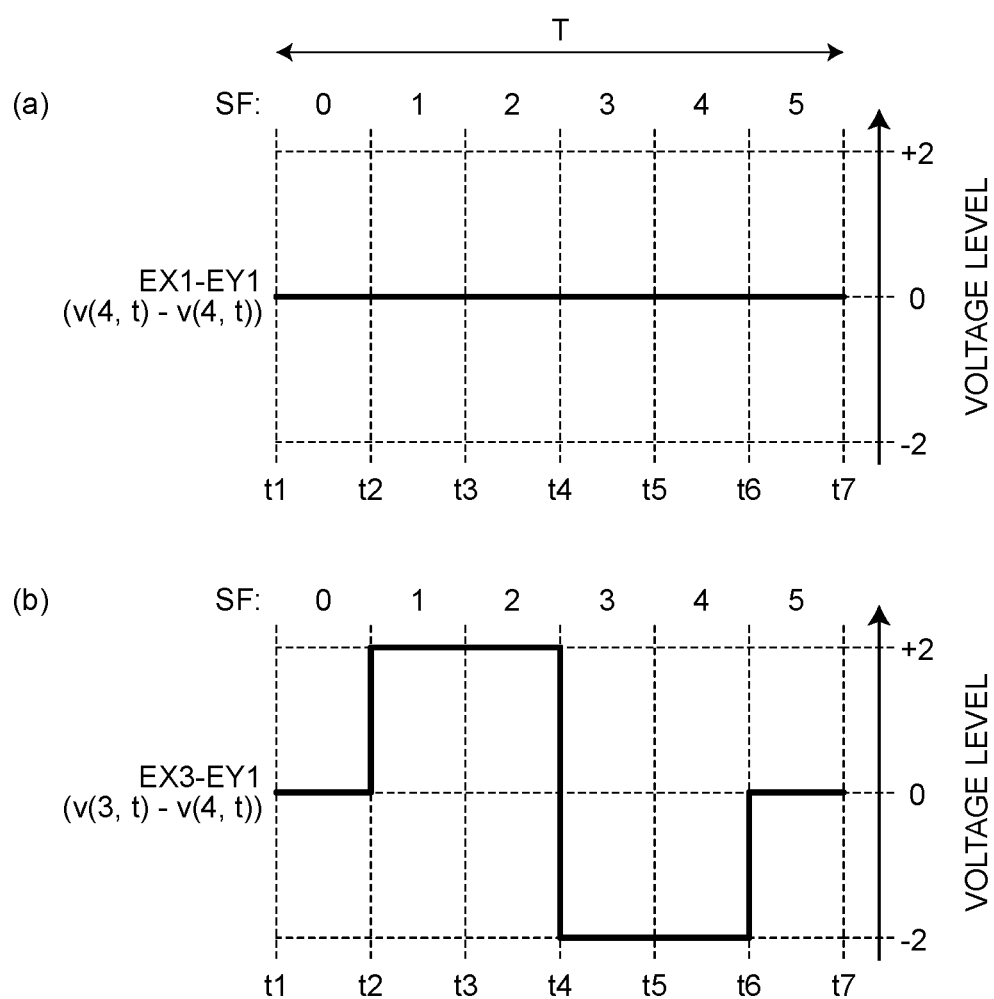
FIG. 7 is a waveform diagram illustrating an applied voltage of a dimming layer in the first embodiment.

As a result, since the same voltage waveform is supplied to the column electrode and the row electrode in any light-shielding region, the voltage applied to the region R is maintained at 0 at any time as illustrated in FIG. 7(*a*). Focusing on, for example, the region R(1,3) of the light-transmitting region, the voltage applied to the dimming layer 21 is as illustrated in FIG. 7(*b*), and the effective value thereof is √(16/6). The other light-transmitting regions also obtain the same effective value of the voltage. Note that FIG. 7 is a waveform diagram illustrating the voltage applied to the dimming layer 21. FIG. 7(*a*) is a waveform diagram of a voltage applied to a portion of the light-shielding region in the dimming layer 21. FIG. 7(*b*) is a waveform diagram of a voltage applied to a portion of the light-transmitting region in the dimming layer 21. The effective value of this voltage is an example, and can be arbitrarily set according to the required characteristics of the dimming layer 21.

Figure 8:
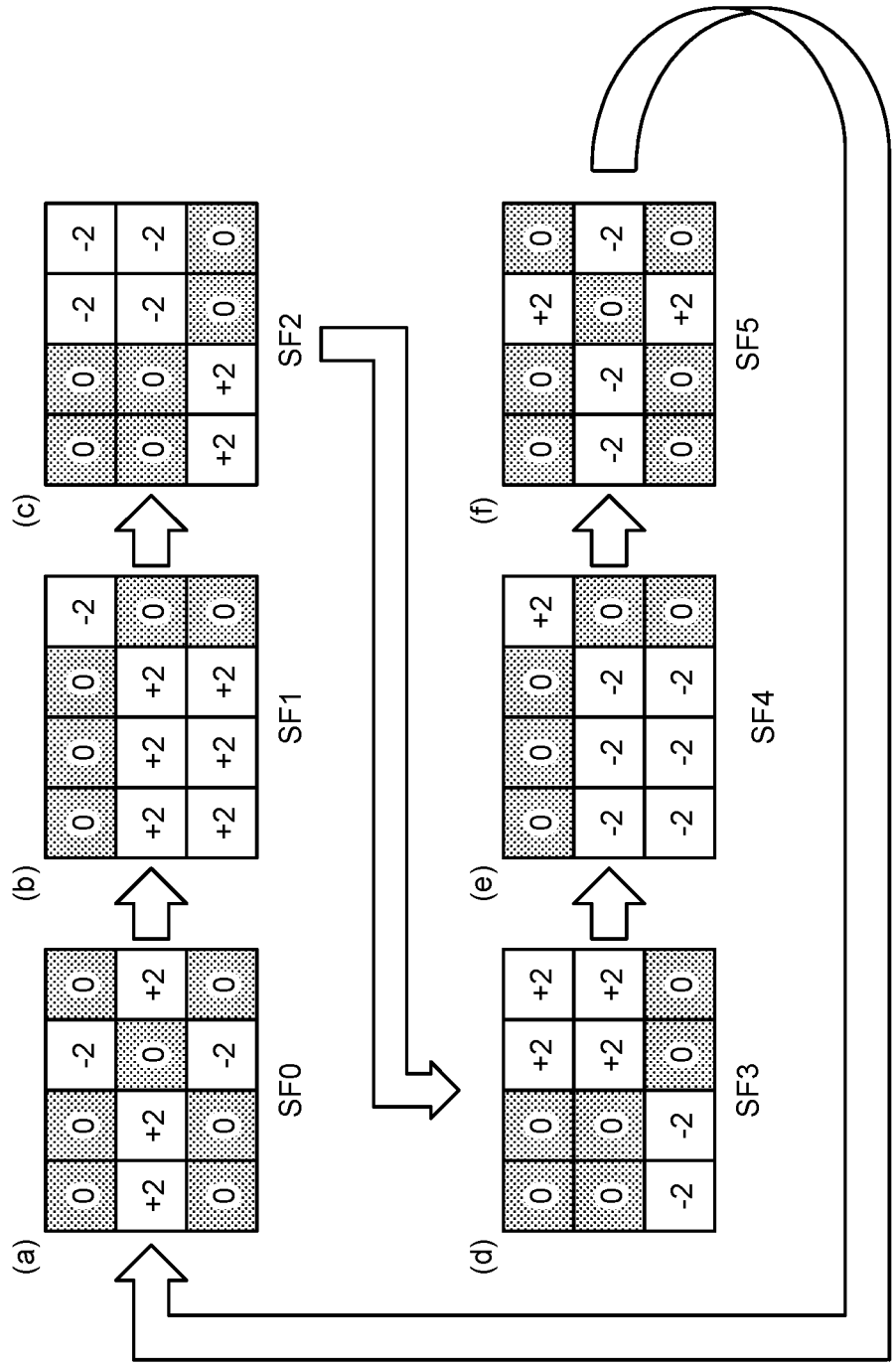
FIG. 8 is a plan view illustrating transition of a dimming pattern of the dimming panel in the first embodiment.

In a case where the voltage waveform illustrated in FIG. 6 is applied to the plurality of regions R(1,1) to R(4,3) illustrated in FIG. 4, the dimming pattern for each subframe period SF is as illustrated in FIGS. 8(*a*) to 8(*f*). FIG. 8 is a plan view illustrating transition of the dimming pattern of the dimming panel.

In the subframe period SF0 illustrated in FIG. 8(*a*), the voltage levels of the voltage waveform v(1,t) and the voltage waveform v(2,t) are the same, and the voltage levels of the voltage waveform v(3,t) and the voltage waveform v(4,t) are the same. In addition to the region R(1,1), the region R(2,1), and the region R(4,3), the region R(4,1), the region R(3,2), the region R(1,3), and the region R(2,3) enter the light-shielding state according to the applied voltage level of 0. The other region R is in a light-transmitting state according to the applied voltage level of +2 or −2.

In the subframe period SF1 illustrated in FIG. 8(*b*), the voltage levels of the voltage waveform v(1,t) and the voltage waveform v(3,t) are the same, and the voltage levels of the voltage waveform v(2,t) and the voltage waveform v(4,t) are the same. In addition to the region R(1,1), the region R(2,1), and the region R(4,3), the region R(3,1) and the region R(4,2) enter the light-shielding state according to the applied voltage level of 0. The other region R is in a light-transmitting state according to the applied voltage level of +2 or −2.

In the subframe period SF2 illustrated in FIG. 8(*c*), the voltage levels of the voltage waveform v(1,t) and the voltage waveform v(4,t) are the same, and the voltage levels of the voltage waveform v(2,t) and the voltage waveform v(3,t) are the same. In addition to the region R(1,1), the region R(2,1), and the region R(4,3), the region R(1,2), the region R(2,2), and the region R(3,3) enter the light-shielding state according to the applied voltage level of 0. The other region R is in a light-transmitting state according to the applied voltage level of +2 or −2.

In the subframe period SF3 illustrated in FIG. 8(*d*), the voltage levels of the voltage waveform v(1,t) and the voltage waveform v(4,t) are the same, and the voltage levels of the voltage waveform v(2,t) and the voltage waveform v(3,t) are the same. In addition to the region R(1,1), the region R(2,1), and the region R(4,3), the region R(1,2), the region R(2,2), and the region R(3,3) enter the light-shielding state according to the applied voltage level of 0. The other region R is in a light-transmitting state according to the applied voltage level of +2 or −2.

In the subframe period SF4 illustrated in FIG. 8(*e*), the voltage levels of the voltage waveform v(1,t) and the voltage waveform v(3,t) are the same, and the voltage levels of the voltage waveform v(2,t) and the voltage waveform v(4,t) are the same. In addition to the region R(1,1), the region R(2,1), and the region R(4,3), the region R(3,1) and the region R(4,2) enter the light-shielding state according to the applied voltage level of 0. The other region R is in a light-transmitting state according to the applied voltage level of +2 or −2.

In the subframe period SF5 illustrated in FIG. 8(*f*), the voltage levels of the voltage waveform v(1,t) and the voltage waveform v(2,t) are the same, and the voltage levels of the voltage waveform v(3,t) and the voltage waveform v(4,t) are the same. In addition to the region R(1,1), the region R(2,1), and the region R(4,3), the region R(4,1), the region R(3,2), the region R(1,3), and the region R(2,3) enter the light-shielding state according to the applied voltage level of 0. The other region R is in a light-transmitting state according to the applied voltage level of +2 or −2.

As illustrated in FIGS. 8(*a*) to 8(*f*), the light-shielding region is in the light-shielding state in any subframe period SF. The light-transmitting region is in a light-transmitting state in at least one subframe period SF.

As described above, in the first embodiment, the dimming device 1 supplies voltages having substantially the same waveform to the column electrode EY and the row electrode EX corresponding to the region R to be shielded among the plurality of regions R(1,1) to R(4,3) of the dimming layer 21, and supplies voltages having different waveforms to the column electrode EY and the row electrode EX corresponding to the region R to be transmitted. As a result, the voltage applied to the region R to be shielded from light among the plurality of regions R of the dimming layer 21 can be set to a value (for example, less than $V_C$ in FIG. 5) theoretically 0 and actually close to 0, and the voltage applied to the region R to be transmitted through light can be set to an appropriate positive value (for example, less than $V_A$ in FIG. 5). As a result, it is possible to obtain the light shielding performance required for the region R to be shielded while individually controlling the dimming of the plurality of regions R. That is, in the plurality of regions R, the light-transmitting region and the light-shielding region can be combined with a high degree of freedom, a two-dimensional degree of freedom of dimming can be improved, and dimming performance of the dimming device 1 can be improved.

Note that, in the dimming device 1, the dimming pattern for the plurality of regions R(1,1) to R(4,3) of the dimming layer 21 is not limited to the dimming pattern illustrated in FIG. 4, and any dimming pattern according to the idea of the first embodiment can be adopted.

Figure 9:
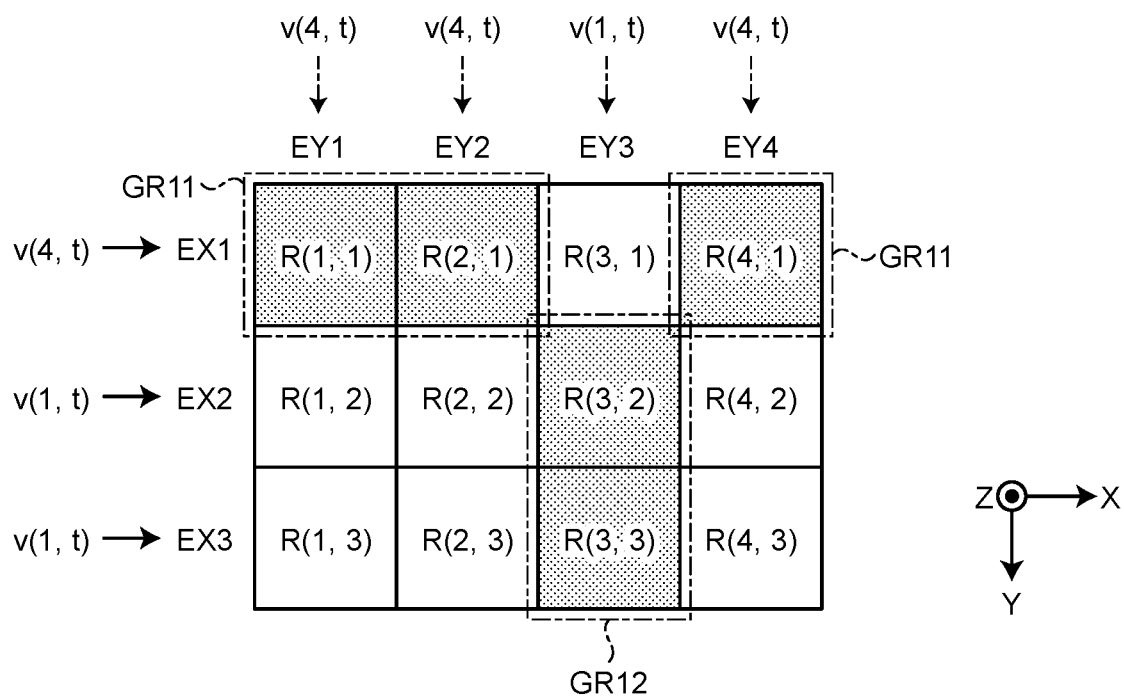
FIG. 9 is a plan view illustrating a dimming pattern of a dimming panel in a first modification of the first embodiment.

For example, as a first modification of the first embodiment, a dimming pattern as illustrated in FIG. 9 may be adopted. FIG. 9 is a plan view illustrating a dimming pattern of the dimming panel 2 in the first modification of the first embodiment. As illustrated in FIG. 9, dimming is considered in which the region R(1,1), the region R(2,1), the region R(4,1), the region R(3,2), and the region R(3,3) are light-shielding regions, and the other regions are light-transmitting regions.

In a case where grouping is performed in the light-shielding region having a common row or column on the basis of the procedure (2), as illustrated in FIG. 9, one light-shielding group GR11 is formed in three regions of the region R(1,1), the region R(1,2), and the region R(4,1), and one light-shielding group GR12 is formed in two regions of the region R(3,2) and the region R(3,3).

On the basis of the procedure (3-1), for example, the voltage waveform v(4,t) is assigned to the column electrodes EY1, EY2, and EY4 and the row electrode EX1 corresponding to the light-shielding group GR11. A voltage waveform different from the voltage waveform v(4,t) is assigned to the column electrode EY3 and the row electrodes EX2 and EX3 corresponding to the light-shielding group GR12. For example, the voltage waveform v(1,t) is assigned to the column electrode EY3 and the row electrodes EX2 and EX3.

On the basis of the procedure (3-2), since there are no column electrode EY and row electrode EX that do not correspond to the light-shielding region, this procedure is skipped.

As a result, in order to supply the same voltage waveform in all the light-shielding regions, the voltage applied to the region R is maintained at substantially zero in time (see FIG. 7(a)). In the light-transmitting region, for example, focusing on the region R(1,3), the effective value of the voltage applied to the dimming layer 21 is $\sqrt{(16/6)}$. The other light-transmitting regions also have the same effective value.

Even with such a dimming pattern, it is possible to obtain the light shielding performance required in the region R to be shielded from light while individually dimming the plurality of regions R.

Figure 10:
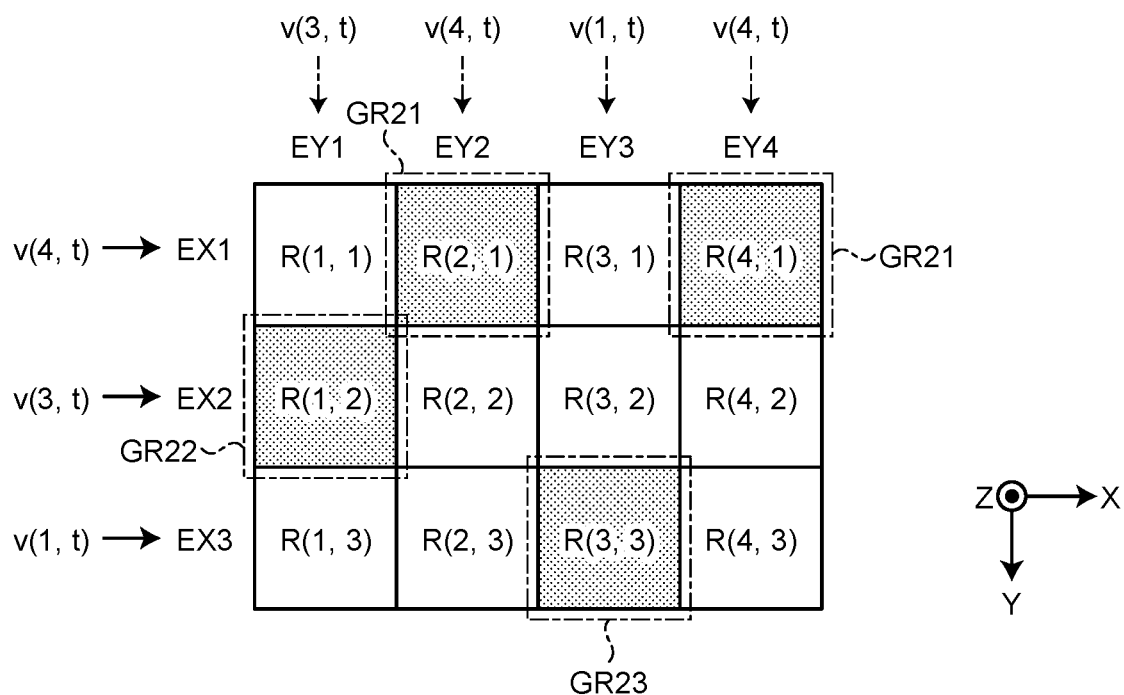
FIG. 10 is a plan view illustrating a dimming pattern of a dimming panel in a second modification of the first embodiment.

Furthermore, as a second modification of the first embodiment, a dimming pattern as illustrated in FIG. 10 may be adopted. FIG. 10 is a plan view illustrating a dimming pattern of a dimming panel according to the second modification of the first embodiment. As illustrated in FIG. 10, dimming is considered in which the region R(2,1), the region R(4,1), the region R(1,2), and the region R(3,3) are light-shielding regions, and the other regions are light-transmitting regions.

In a case where grouping is performed in the light-shielding region having a common row or column on the basis of the procedure (2), as illustrated in FIG. 10, one light-shielding group GR21 is formed in two regions of the region R(2,1) and the region R(4,1), one light-shielding group GR22 is formed in one region of the region R(1,2), and one light-shielding group GR23 is formed in one region of the region R(3,3).

On the basis of the procedure (3-1), for example, the voltage waveform v(4,t) is assigned to the column electrodes EY2 and EY4 and the row electrode EX1 corresponding to the light-shielding group GR21. A voltage waveform different from the voltage waveform v(4,t) is assigned to the column electrode EY1 and the row electrode EX2 corresponding to the light-shielding group GR22. For example, the voltage waveform v(3,t) is assigned to the column electrode EY1 and the row electrode EX2. Voltage waveforms different from the voltage waveform v(4,t) and the voltage waveform v(3,t) are assigned to the column electrode EY3 and the row electrode EX3 corresponding to the light-shielding group GR23. For example, the voltage waveform v(1,t) is assigned to the column electrode EY3 and the row electrode EX3.

On the basis of the procedure (3-2), since there are no column electrode EY and row electrode EX that do not correspond to the light-shielding region, this procedure is skipped.

As a result, in order to supply the same voltage waveform in all the light-shielding regions, the voltage applied to the region R is maintained at substantially zero in time (see FIG. 7(a)). In the light-transmitting region, for example, focusing on the region R(1,3), the effective value of the voltage applied to the dimming layer 21 is $\sqrt{(16/6)}$. The other light-transmitting regions also have the same effective value.

Even with such a dimming pattern, it is possible to obtain the light shielding performance required in the region R to be shielded from light while individually dimming the plurality of regions R.

Figure 11:
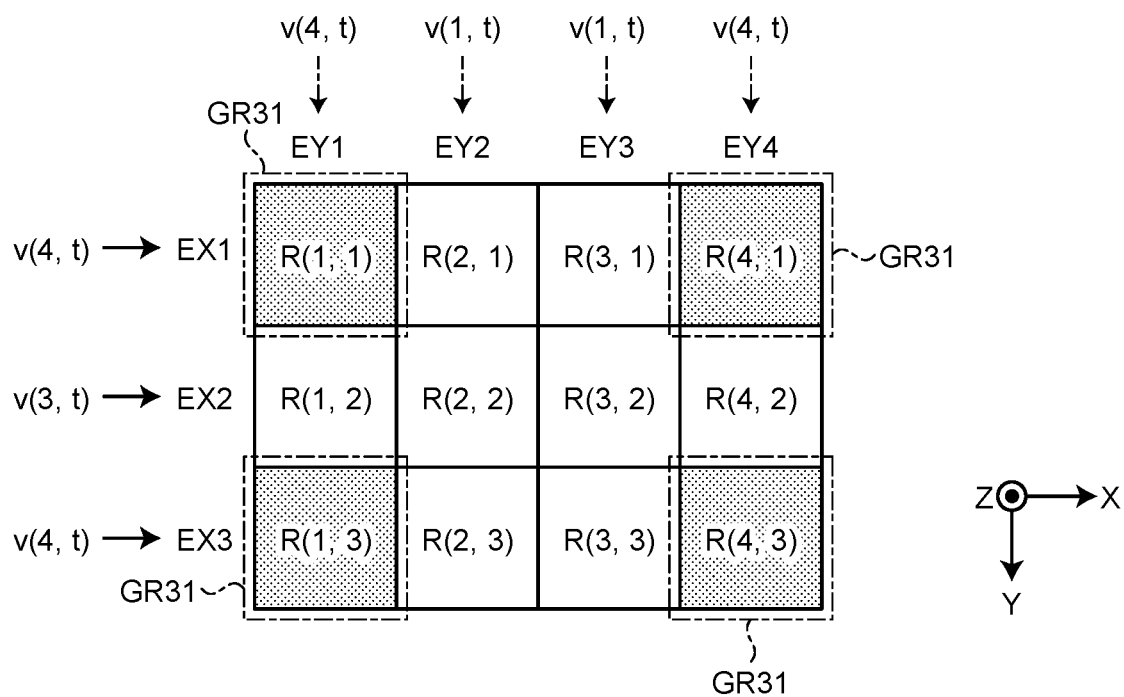
FIG. 11 is a plan view illustrating a dimming pattern of a dimming panel in a third modification of the first embodiment.

Furthermore, as a third modification of the first embodiment, a dimming pattern as illustrated in FIG. 11 may be adopted. FIG. 11 is a plan view illustrating a dimming pattern of a dimming panel according to the third modification of the first embodiment. As illustrated in FIG. 11, dimming is considered in which the region R(1,1), the region R(4,1), the region R(1,3), and the region R(4,3) are light-shielding regions, and the other regions are light-transmitting regions.

In a case where grouping is performed in the light-shielding region having a common row or column on the basis of the procedure (2), as illustrated in FIG. 11, one light-shielding group GR31 is formed in four regions of the region R(1,1), the region R(4,1), the region R(1,3), and the region R(4,3).

On the basis of the procedure (3-1), for example, the voltage waveform v(4,t) is assigned to the column electrode EY1, the column electrode EY4, the row electrode EX1, and the row electrode EX3 corresponding to the light-shielding group GR31.

On the basis of the procedure (3-2), a voltage waveform different from the voltage waveform v(4,t) is assigned to the column electrodes EY2 and EY3 and the row electrode EX2 that do not correspond to the light-shielding region. For example, the voltage waveform v(1,t) is assigned to the column electrodes EY2 and EY3, and the voltage waveform v(3,t) is assigned to the row electrode X2. As a result, in order to supply the same voltage waveform in all the light-shielding regions, the voltage applied to the region R is maintained at substantially zero in time (see FIG. 7(a)). In the light-transmitting region, for example, focusing on the region R(1,3), the effective value of the voltage applied to the dimming layer 21 is √(16/6). The other light-transmitting regions also have the same effective value.

Even with such a dimming pattern, it is possible to obtain the light shielding performance required in the region R to be shielded from light while individually dimming the plurality of regions R.

Second Embodiment

Next, a dimming device 1 according to a second embodiment will be described. Hereinafter, portions different from those of the first embodiment will be mainly described.

In the first embodiment, the voltage waveform v(1,t) to the voltage waveform v(4,t) of one frame period T=6× (subframe period SF) are exemplified, but in the second embodiment, a voltage waveform v(1,t) to a voltage waveform v(4,t) of one frame period T200=3×(subframe period SF) are exemplified.

Here, in order to suppress the generation of the residual charge in each row electrode EX and each column electrode EY, it is desirable that the number of times the voltage becomes positive and the number of times the voltage becomes negative are equal in each of the voltage waveform v(1,t) to the voltage waveform v(4,t). In this regard, each of the voltage waveform v(1,t) to the voltage waveform v(4,t) illustrated in FIG. 6 is line-symmetric with the original waveform with respect to the straight line of the voltage level 0 when shifted by half cycle.

Figure 12:
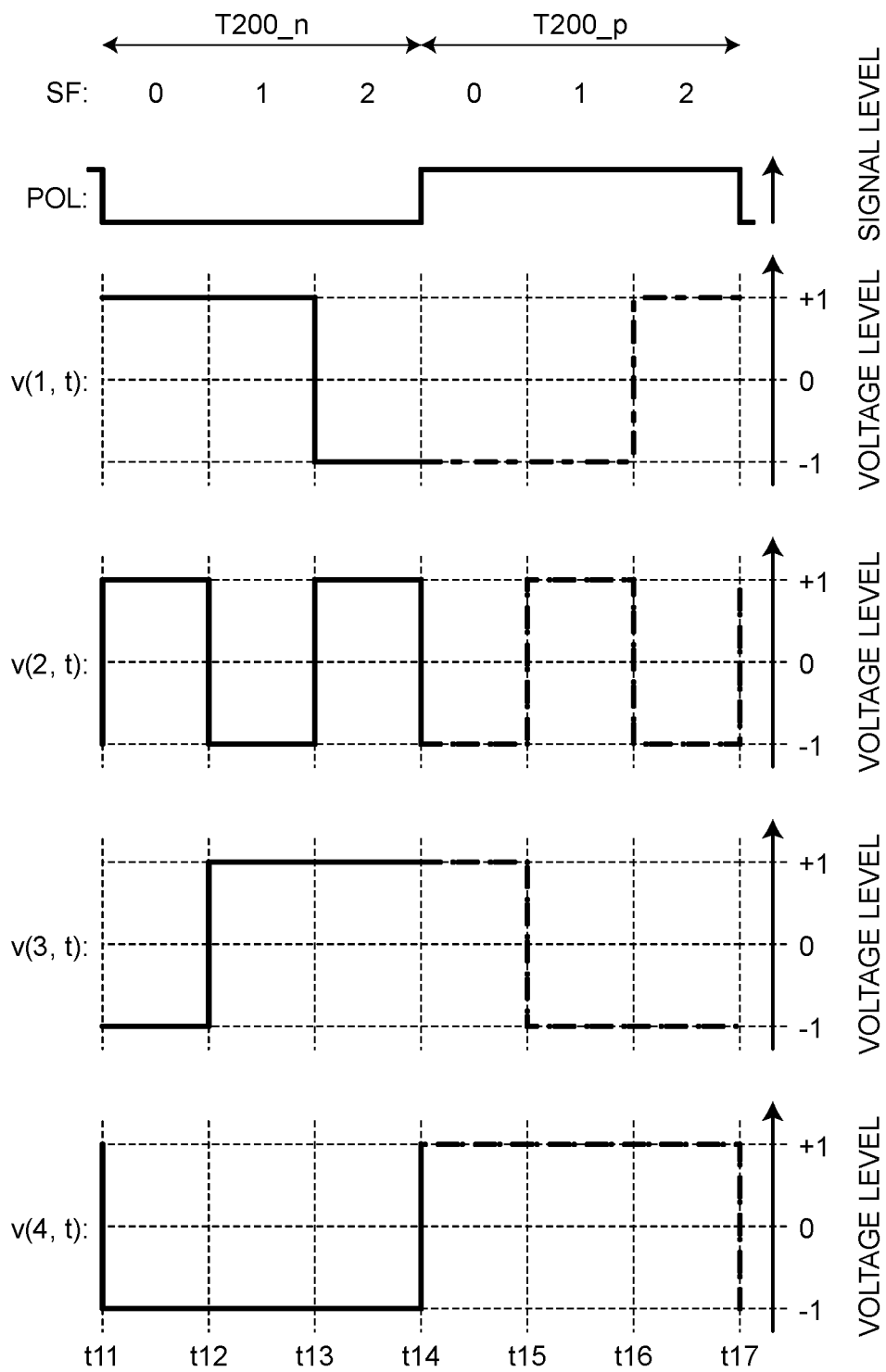
FIG. 12 is a waveform diagram illustrating voltages to be supplied to a column electrode and a row electrode in a second embodiment.
Figure 13:
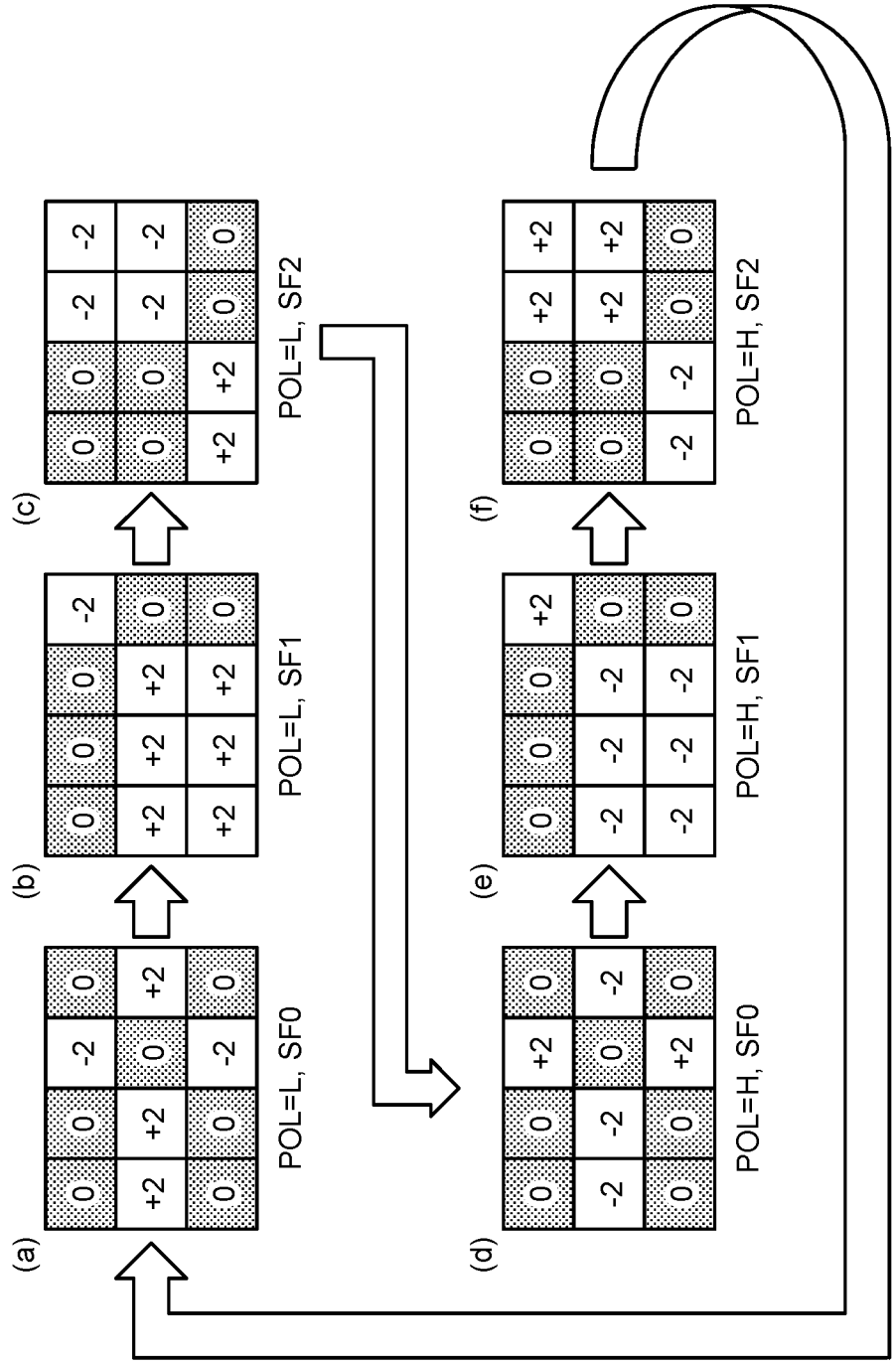
FIG. 13 is a plan view illustrating transition of a dimming pattern of a dimming panel in a second embodiment.

Focusing on this point, in the second embodiment, as illustrated in FIG. 12, one frame period T is divided into two frame periods T200_n and T200_p in which the polarity of the voltage waveform is inverted, each voltage waveform is also divided into two waveforms of a solid line and a dotted line, and the waveform of the solid line is set in the dimming device 1. In response to this, the polarity signal POL indicating the polarity of the frame period T200 is additionally introduced. FIG. 12 is a waveform diagram illustrating a voltage waveform v to be supplied to the column electrode EY and the row electrode EX in the second embodiment.

The polarity signal POL indicates a negative polarity at the L level and a positive polarity at the H level. The polarity signal POL is maintained at the L level at timing t11 to timing t14, transitions from the L level to the H level at timing t14, is maintained at the H level at timing t14 to timing t17, and transitions from the H level to the L level at timing t17.

The frame period T200_n is a period from the timing t11 to timing t14, is a period in which the polarity signal POL is maintained at the L level, and is a period in which the polarity is negative. The frame period T200_p is a period from the timing t14 to timing t17, is a period in which the polarity signal POL is maintained at the H level, and is a period in which the polarity is positive.

For example, four types of voltage waveforms v(1,t) to v(4,t) indicated by solid lines in FIG. 12 can be set in advance in the arithmetic circuit 5, the column electrode drive circuit 4, and the row electrode drive circuit 3 (see FIG. 1). The polarity signal POL may be generated by the arithmetic circuit 5 and supplied to each of the column electrode drive circuit 4 and the row electrode drive circuit 3.

In the frame period T200_n, the arithmetic circuit 5 supplies the column control signal and the L level polarity signal POL to the column electrode drive circuit 4. Based on the polarity signal POL at the L level, the column electrode drive circuit 4 drives each of the plurality of column electrodes EY1 to EY4 with the voltage waveform v (that is, the waveform indicated by the solid line in FIG. 12) corresponding to the column control signal in synchronization with the clock signal.

At the same time, the arithmetic circuit 5 supplies the row control signal and the L level polarity signal POL to the row electrode drive circuit 3. Based on the polarity signal POL at the L level, the row electrode drive circuit 3 drives each of the plurality of row electrodes EX1 to EX3 with the voltage waveform v (that is, the waveform indicated by the solid line in FIG. 12) according to the column control signal in synchronization with the clock signal.

In the frame period T200_p, the arithmetic circuit 5 supplies the column control signal and the H-level polarity signal POL to the column electrode drive circuit 4. Based on the polarity signal POL at the H level, the column electrode drive circuit 4 generates a voltage waveform v (that is, the waveform indicated by the dotted line in FIG. 12) whose sign is inverted with respect to a voltage waveform v (that is, a waveform indicated by the solid line in FIG. 12) corresponding to the column control signal in synchronization with the clock signal. The column electrode drive circuit 4 may invert the sign of the voltage waveform v by converting the voltage level −1 of the voltage waveform v to the L level, converting the voltage level +1 to the H level, calculating the exclusive OR of the polarity signal POL and the voltage waveform v, converting the L level in the calculation result to the voltage level −1, and converting the H level in the calculation result to the voltage level +1. The column electrode drive circuit 4 drives each of the plurality of column electrodes EY1 to EY4 with the generated voltage waveform v.

At the same time, the arithmetic circuit 5 supplies the row control signal and the L level polarity signal POL to the row electrode drive circuit 3. Based on the polarity signal POL at the H level, the row electrode drive circuit 3 generates a voltage waveform v (that is, the waveform indicated by the dotted line in FIG. 12) whose sign is inverted with respect to the voltage waveform v (that is, a waveform indicated by the solid line in FIG. 12) corresponding to the column control signal in synchronization with the clock signal. The row electrode drive circuit 3 may invert the sign of the voltage waveform v by converting the voltage level −1 of the voltage waveform v to the L level, converting the voltage level +1 to the H level, calculating the exclusive OR of the polarity signal POL and the voltage waveform v, converting the L level in the calculation result to the voltage level −1, and converting the H level in the calculation result to the voltage level +1. The row electrode drive circuit 3 drives each of the plurality of row electrodes EX1 to EX3 with the generated voltage waveform v.

In addition, the dimming pattern for each subframe period SF is as illustrated in FIGS. 13(a) to 13(f). FIG. 13 is a plan view illustrating transition of a dimming pattern of the dimming panel.

In the subframe period SF0 of the polarity signal POL=L illustrated in FIG. 13(a), the voltage levels of the voltage waveform v(1,t) and the voltage waveform v(2,t) are the same, and the voltage levels of the voltage waveform v(3,t) and the voltage waveform v(4,t) are the same. In addition to the region R(1,1), the region R(2,1), and the region R(4,3), the region R(4,1), the region R(3,2), the region R(1,3), and the region R(2,3) enter the light-shielding state according to the applied voltage level of 0. The other region R is in a light-transmitting state according to the applied voltage level of +2 or −2.

In the subframe period SF1 of POL=L illustrated in FIG. 13(b), the voltage levels of the voltage waveform v(1,t) and the voltage waveform v(3,t) are the same, and the voltage levels of the voltage waveform v(2,t) and the voltage waveform v(4,t) are the same. In addition to the region R(1,1), the region R(2,1), and the region R(4,3), the region R(3,1) and the region R(4,2) enter the light-shielding state according to the applied voltage level of 0. The other region R is in a light-transmitting state according to the applied voltage level of +2 or −2.

In the subframe period SF2 of POL=L illustrated in FIG. 13(c), the voltage levels of the voltage waveforms v(1,t) and v(4,t) are the same, and the voltage levels of the voltage waveform v(2,t) and the voltage waveform v(3,t) are the same. In addition to the region R(1,1), the region R(2,1), and the region R(4,3), the region R(1,2), the region R(2,2), and the region R(3,3) enter the light-shielding state according to the applied voltage level of 0. The other region R is in a light-transmitting state according to the applied voltage level of +2 or −2.

In the subframe period SF0 of POL=H illustrated in FIG. 13(d), the voltage levels of the voltage waveforms v(1,t) and v(2,t) are the same, and the voltage levels of the voltage waveform v(3,t) and the voltage waveform v(4,t) are the same. In addition to the regions R(1,1), R(2,1), and R(4,3), the region R(4,1), the region R(3,2), the region R(1,3), and the region R(2,3) enter the light-shielding state according to the applied voltage level of 0. The other region R is in a light-transmitting state according to the applied voltage level of +2 or −2.

In the subframe period SF1 of POL=H illustrated in FIG. 13(e), the voltage levels of the voltage waveforms v(1,t) and v(3,t) are the same, and the voltage levels of the voltage waveform v(2,t) and the voltage waveform v(4,t) are the same. In addition to the region R(1,1), the region R(2,1), and the region R(4,3), the region R(3,1) and the region R(4,2) enter the light-shielding state according to the applied voltage level of 0. The other region R is in a light-transmitting state according to the applied voltage level of +2 or −2.

In the subframe period SF2 of POL=H illustrated in FIG. 13(f), the voltage levels of the voltage waveform v(1,t) and the voltage waveform v(4,t) are the same, and the voltage levels of the voltage waveform v(2,t) and the voltage waveform v(3,t) are the same. In addition to the region R(1,1), the region R(2,1), and the region R(4,3), the region R(1,2), the region R(2,2), and the region R(3,3) enter the light-shielding state according to the applied voltage level of 0. The other region R is in a light-transmitting state according to the applied voltage level of +2 or −2.

As illustrated in FIGS. 13(a) to 13(f), the light-shielding region is in the light-shielding state in any subframe period SF. The light-transmitting region is in a light-transmitting state in at least one subframe period SF.

As described above, in the second embodiment, in the dimming device 1, two frame periods T200_n and T200_p in which the polarity of the voltage waveform is inverted are provided, and the polarity signal POL indicating the polarity of the frame period T200 is introduced. In the dimming device 1, a waveform of one polarity of the two polarities is set in advance, and a waveform of the other polarity is generated from a waveform of one polarity according to the polarity signal POL. As a result, the information amount of the voltage waveform set in advance in the dimming device 1 can be reduced, and the circuit scale of the circuit (for example, arithmetic circuit 5, column electrode drive circuit 4, and row electrode drive circuit 3) in which the voltage waveform is set in advance can be reduced. As a result, the cost of the dimming device 1 can be reduced.

In addition, in the second embodiment, in the dimming device 1, the waveform of one polarity of the two polarities is set in advance, and the waveform of the other polarity is generated from the waveform of the one polarity according to the polarity signal POL. As a result, in each voltage waveform, the number of times the voltage becomes positive and the number of times the voltage becomes negative can be equalized, so that generation of residual charges in each row electrode and each column electrode can be suppressed.

Third Embodiment

Next, a dimming device 1 according to a third embodiment will be described. Hereinafter, differences from the first embodiment and the second embodiment will be mainly described.

In the first embodiment and the second embodiment, four types (P=4) of voltage waveforms v are exemplified, but in the third embodiment, six types (P=6) of voltage waveforms v are exemplified.

When the number of regions R partitioned in a matrix form by the dimming layer 21 is increased, it is expected that the light-transmitting region and the light-shielding region can be more finely controlled, and the dimming performance of the dimming device 1 can be improved. At this time, the number of types P of the voltage waveform v may be an integer corresponding to the larger value Max (M,N) of the number of rows N and the number of columns M of the plurality of regions R partitioned by the dimming layer 21. Therefore, the number of types P of the voltage waveform v may increase as the number of regions R increases.

Figure 14:
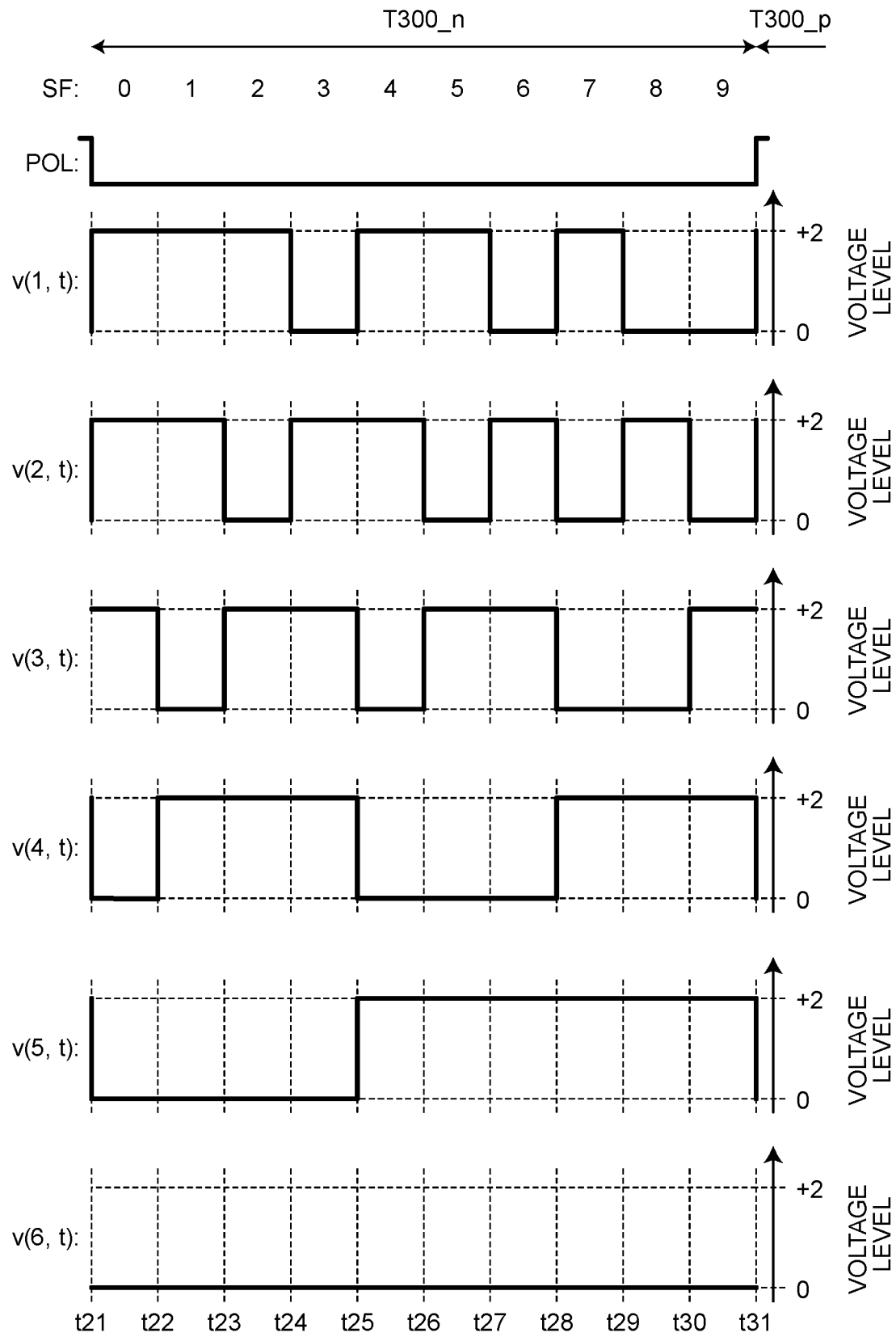
FIG. 14 is a waveform diagram illustrating voltage waveforms to be supplied to a column electrode and a row electrode in a third embodiment.

For example, in the case of P=6, six types of voltage waveforms v(1,t) to v(6,t) illustrated in FIG. 14 are prepared as candidate voltage waveforms according to the procedure (1). FIG. 14 is a waveform diagram illustrating a voltage waveform v to be supplied to the column electrode EY and the row electrode EX in the third embodiment.

The polarity signal POL indicates a negative polarity at the L level and a positive polarity at the H level. The polarity signal POL is maintained at the L level at timing t21 to timing t31, transits from the L level to the H level at timing t31, and is maintained at the H level after timing t31.

A frame period T300_n is a period from the timing t21 to the timing t31, is a period in which the polarity signal POL is maintained at the L level, and is a period in which the polarity is negative. A frame period T300_p is a period after the timing t31, is a period in which the polarity signal POL is maintained at the H level, and is a period in which the polarity is positive.

At this time, in order to satisfy Mathematical Formula (4) and Mathematical Formula (5) while making the six types of voltage waveforms v(1,t) to v(6,t) have patterns of voltage levels temporally different from each other, the number of subframe periods to be included in one frame period is 20. As the number of subframe periods increases, the information amount of the voltage waveform set in advance in the dimming device 1 increases.

Therefore, in the same manner as in the second embodiment, as illustrated in FIG. 14, one frame period T is divided into two frame periods T300_n and T300_p in which the polarity is inverted, each voltage waveform is also divided into two waveforms of a solid line and a dotted line (not illustrated), and the waveform of the solid line is set in the dimming device 1. In response to this, the polarity signal POL indicating the polarity of the frame period T300 is additionally introduced.

Note that the dimming device 1 is similar to the second embodiment in that the waveform of one polarity of the two polarities is set in advance and the waveform of the other polarity is generated from the waveform of the one polarity according to the polarity signal POL.

When calculation is performed for each of the six types of voltage waveforms v(1,t) to v(6,t) illustrated in FIG. 14, A=20 illustrated in Mathematical Formula (5), B=40 illustrated in Mathematical Formula (6), and C=16 illustrated in Mathematical Formula (6). That is, the six types of voltage waveforms v(1,t) to v(6,t) illustrated in FIG. 14 conform to the procedure (1).

Then, according to the procedures (2) to (4), these voltage waveforms are assigned to the grouped light-shielding regions and the other regions. As a result, all the light-shielding regions have the effective value 0, and all the light-transmitting regions have the effective value $\sqrt{(24/10)}$.

As described above, in the third embodiment, in the dimming device 1, two frame periods $T200\_n$ and $T200\_p$ in which the polarity of the voltage waveform is inverted are provided, and the polarity signal POL indicating the polarity of the frame period T200 is introduced. In the dimming device 1, a waveform of one polarity of the two polarities is set in advance, and a waveform of the other polarity is generated from a waveform of one polarity according to the polarity signal POL. As a result, the information amount of the voltage waveform set in advance in the dimming device 1 can be reduced, and the circuit scale of the circuit (for example, arithmetic circuit 5, column electrode drive circuit 4, and row electrode drive circuit 3) in which the voltage waveform is set in advance can be reduced. As a result, the cost of the dimming device 1 can be reduced.

In addition, in the third embodiment, in the dimming device 1, the waveform of one polarity of the two polarities is set in advance, and the waveform of the other polarity is generated from the waveform of the one polarity according to the polarity signal POL. As a result, in each voltage waveform, the number of times the voltage becomes positive and the number of times the voltage becomes negative can be equalized, so that generation of residual charges in each row electrode and each column electrode can be suppressed.

Fourth Embodiment

Next, a dimming device 1 according to a fourth embodiment will be described. Hereinafter, differences from the first to third embodiments will be mainly described.

In the second embodiment and the third embodiment, the configuration is exemplified in which each voltage waveform is divided into two portions whose polarities are inverted, and one portion is adopted to reduce an information amount of the waveform to be set. Meanwhile, in the fourth embodiment, a configuration in which the information amount of the waveform to be set is further reduced by additionally combining the voltage waveforms with the waveforms corresponding to the orthogonal function is exemplified.

When a virtual space for a plurality of orthogonal functions is regarded as a vector space, the plurality of orthogonal functions are vectorially orthogonal, and an inner product thereof becomes zero. An arbitrary function can be expressed by linear combination of a plurality of functions. Therefore, by making the plurality of voltage waveforms to be prepared correspond to the plurality of orthogonal functions, it is expected that different voltage waveforms can be efficiently generated in less subframe periods.

Figure 15:
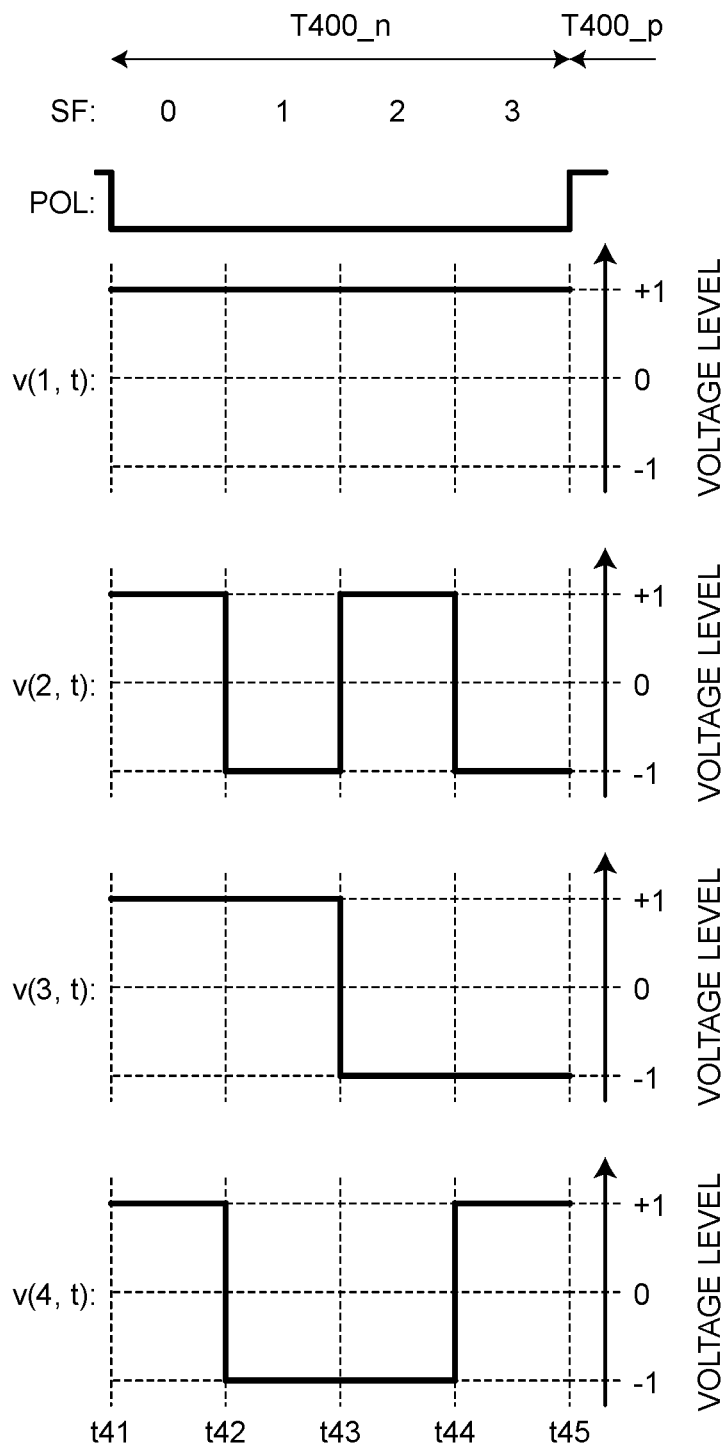
FIG. 15 is a waveform diagram illustrating voltage waveforms to be supplied to a column electrode and a row electrode in a fourth embodiment.

Based on such an idea, in the fourth embodiment, each voltage waveform is set to a waveform corresponding to an orthogonal function. A Walsh function may be adopted as the orthogonal function. For example, in a case where the number of types of voltage waveforms P=4, four types of voltage waveforms v(1,t) to v(4,t) illustrated in FIG. 15 are prepared as candidate voltage waveforms according to the procedure (1). FIG. 15 is a waveform diagram illustrating a voltage waveform v to be supplied to the column electrode EY and the row electrode EX in the fourth embodiment.

The polarity signal POL indicates a negative polarity at the L level and a positive polarity at the H level. The polarity signal POL is maintained at the L level at timing t41 to timing t45, transits from the L level to the H level at timing t45, and is maintained at the H level after timing t45.

A frame period $T400\_n$ is a period from the timing t41 to the timing t45, is a period in which the polarity signal POL is maintained at the L level, and is a period in which the polarity is negative. A frame period $T400\_p$ is a period after the timing t45, is a period in which the polarity signal POL is maintained at the H level, and is a period in which the polarity is positive.

At this time, in order to satisfy Mathematical Formula (4) and Mathematical Formula (5) while making the four types of voltage waveforms v(1,t) to v(4,t) have patterns of voltage levels temporally different from each other, the number of subframe periods to be included in one frame period is eight. As the number of subframe periods increases, the information amount of the voltage waveform set in advance in the dimming device 1 increases.

Therefore, in the same manner as in the second embodiment, as illustrated in FIG. 15, one frame period T is divided into two frame periods $T400\_n$ and $T400\_p$ in which the polarity is inverted, each voltage waveform is also divided into two waveforms of a solid line and a dotted line (not illustrated), and the waveform of the solid line is set in the dimming device 1. In response to this, the polarity signal POL indicating the polarity of the frame period T400 is additionally introduced.

Note that the dimming device 1 is similar to the second embodiment in that the waveform of one polarity of the two polarities is set in advance and the waveform of the other polarity is generated from the waveform of the one polarity according to the polarity signal POL.

When calculation is performed for each of the four types of voltage waveforms v(1,t) to v(4,t) illustrated in FIG. 15, A=0 illustrated in Mathematical Formula (5), B=8 illustrated in Mathematical Formula (6), and C=0 illustrated in Mathematical Formula (6). That is, the four types of voltage waveforms v(1,t) to v(4,t) illustrated in FIG. 15 conform to the procedure (1).

Then, according to the procedures (2) to (4), these voltage waveforms are assigned to the grouped light-shielding regions and the other regions. As a result, each of the light-shielding regions has the effective value 0, and each of the light-transmitting regions has the effective value $\sqrt{(2)}$.

Similarly, in a case where one frame period T includes 2n subframe periods SF, P=2n types of voltage waveforms corresponding to the Walsh function are prepared, so that a voltage waveform suitable for the procedure (1) can be prepared, and processing according to the procedures (2) to (4) can be performed. As a result, even in a case where the number of matrices of the plurality of regions R to be dimmed is large, it is possible to efficiently generate and process different voltage waveforms in a smaller subframe period, and it is possible to set all the light-shielding regions to the effective value 0 and all the light-transmitting regions to the effective value √(2).

As described above, in the fourth embodiment, in the dimming device 1, two frame periods T400_n and T400_p in which the polarity of the voltage waveform is inverted are provided, and in addition to introducing the polarity signal POL indicating the polarity of the frame period T200, each voltage waveform is set to a waveform corresponding to the orthogonal function. As a result, the information amount of the voltage waveform set in advance in the dimming device 1 can be further reduced, and the circuit scale of the circuit (for example, arithmetic circuit 5, column electrode drive circuit 4, and row electrode drive circuit 3) in which the voltage waveform is set in advance can be further reduced. As a result, the cost of the dimming device 1 can be further reduced.

Fifth Embodiment

Next, a dimming device 1 according to a fifth embodiment will be described. Hereinafter, differences from the first to fourth embodiments will be mainly described.

In the first to fourth embodiments, a device focusing on an off-state region is exemplified, but in the fifth embodiment, a device focusing on an on-state region is exemplified.

Voltages having substantially the same waveforms are applied to the column electrode and the row electrode corresponding to the off-state region, but voltages having different waveforms are applied to the column electrode and the row electrode corresponding to the on-state region. Depending on the dimming pattern, the column electrode extends over the off-state region and the on-state region, or the row electrode extends over the off-state region and the on-state region. In this case, when the variation width of the applied voltage to the on-state region is suppressed by devising the way of selecting different waveforms, it is expected that the voltage of the off-state region can be stabilized and the external light in the off-state region can be effectively attenuated.

Figure 16:
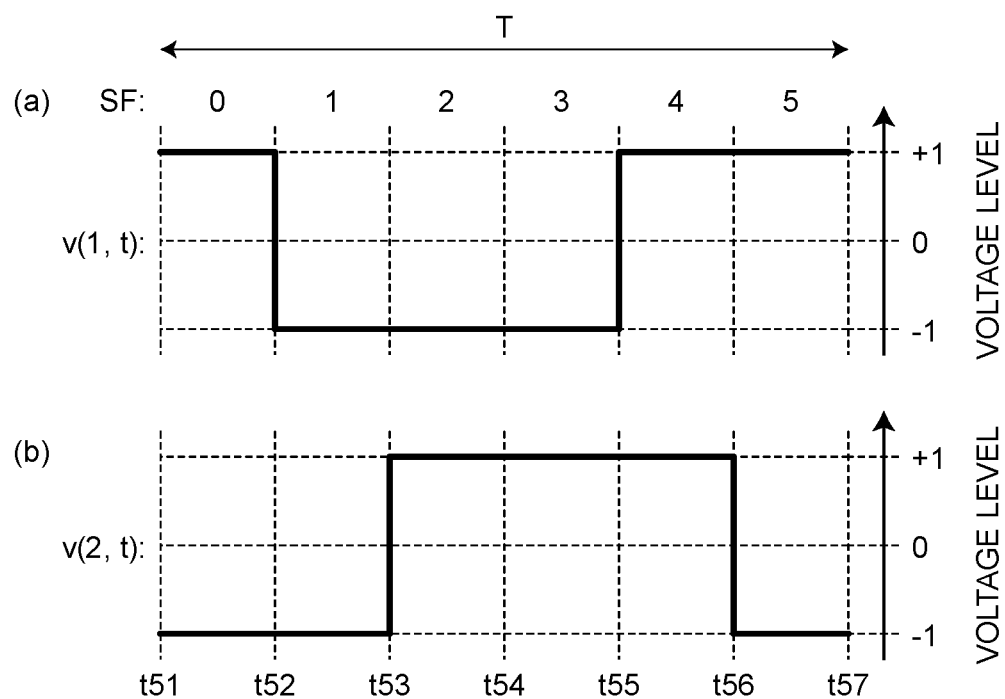
FIG. 16 is a waveform diagram illustrating voltage waveforms to be supplied to a column electrode and a row electrode in a fifth embodiment.

For example, the dimming device 1 may prepare a voltage waveform whose transition timings do not overlap in the procedure (1). In the case of P=2, two types of voltage waveforms v(1,t) and voltage waveforms v(2,t) illustrated in FIG. 16 can be prepared as the candidate voltage waveforms. FIG. 16 is a waveform diagram illustrating a voltage waveform v to be supplied to the column electrode EY and the row electrode EX in the fifth embodiment.

In the waveform v(1,t), the voltage transits from (+1) to (−1) at timing t52, and the voltage transits from (−1) to (+1) at timing t55.

In the waveform v(2,t), the voltage transits from (−1) to (+1) at timing t53, and the voltage transits from (+1) to (−1) at timing t56.

The transition timings t52 and t55 of the waveform v(1,t) and the transition timings t53 and t 56 of the waveform v(2,t) are different from each other. At the timings t51, t54, and t57, none of the waveforms v transitions.

Figure 17:
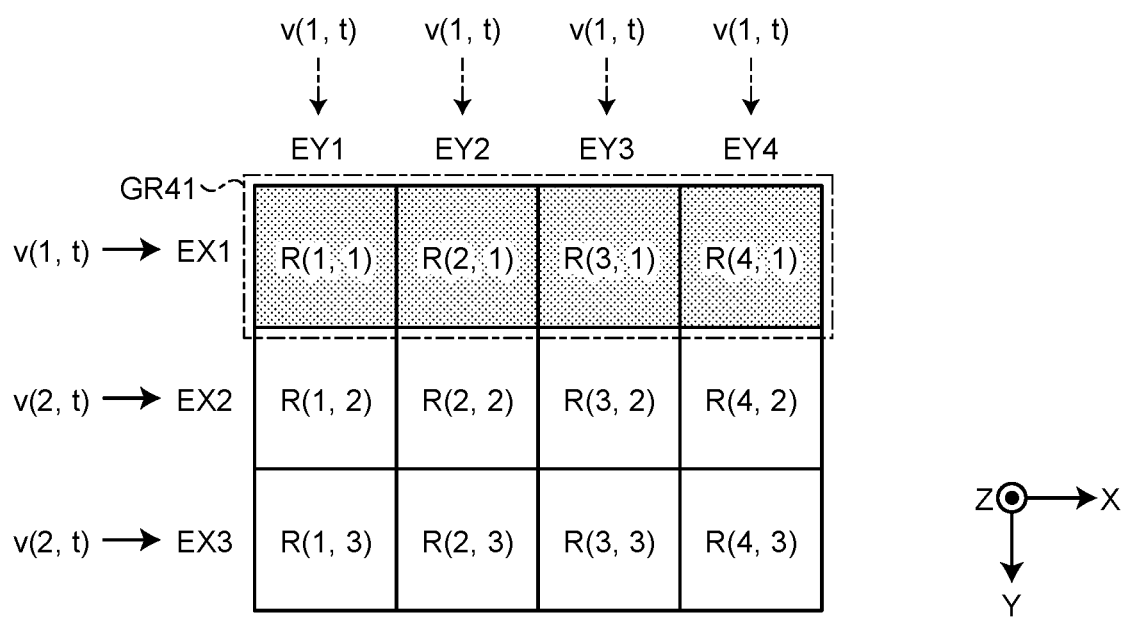
FIG. 17 is a plan view illustrating a dimming pattern of a dimming panel in a fifth embodiment.

At this time, a dimming pattern as illustrated in FIG. 17 may be adopted. FIG. 17 is a plan view illustrating a dimming pattern of a dimming panel 2 in the fifth embodiment. As illustrated in FIG. 17, dimming is considered in which the region R(1,1), the region R(2,1), the region R(3,1), and the region R(4,1) are light-shielding regions, and the other regions are light-transmitting regions.

In a case where grouping is performed in the light-shielding region having a common row or column on the basis of the procedure (2), as illustrated in FIG. 17, one light-shielding group GR41 is formed in four regions of the region R(1,1), the region R(2,1), the region R(3,1), and the region R(4,1).

On the basis of the procedure (3-1), for example, the voltage waveform v(1,t) is assigned to the column electrodes EY1, EY2, EY3, and EY4 and the row electrode EX1 corresponding to the light-shielding group GR41.

On the basis of the procedure (3-2), a voltage waveform different from the voltage waveform v(1,t) is assigned to the row electrodes EX2 and EX3 that do not correspond to the light-shielding region. For example, the voltage waveform v(2,t) is assigned to the row electrodes EX2 and EX3.

Figure 18:
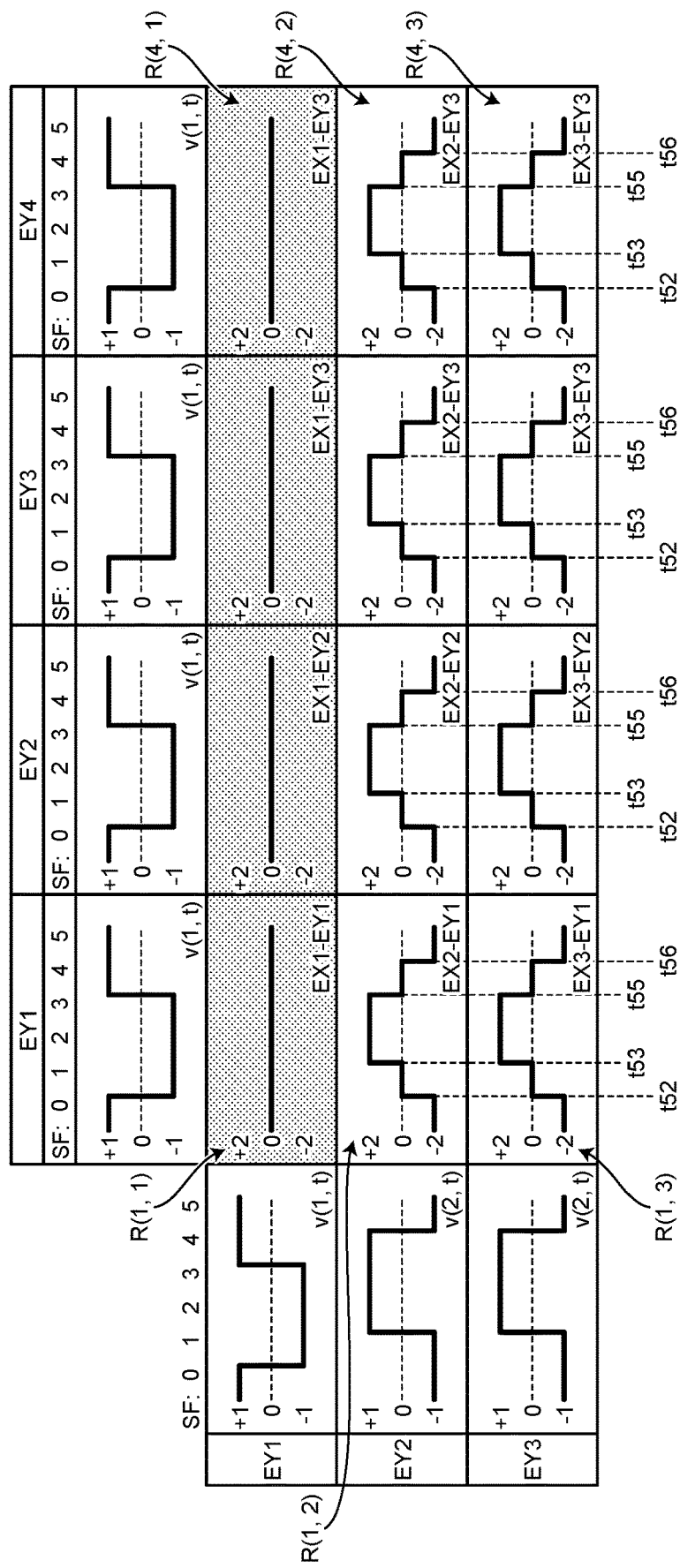
FIG. 18 is a waveform diagram illustrating an applied voltage of a dimming layer in a fifth embodiment.

As a result, as illustrated in FIG. 18, in order to supply the same voltage waveform to all the light-shielding regions, the voltages applied to the regions R(1,1) to R(4,1) are maintained at substantially 0 in terms of time. FIG. 18 is a waveform diagram illustrating a voltage applied to the dimming layer 21 in the fifth embodiment. Each of the regions R(1,1) to R(4,3) in FIG. 18 corresponds to each of the regions R(1,1) to R(4,3) in FIG. 17.

In any of the light-transmitting regions, the applied voltage of the region R is substantially 0 at the timing when the voltages to the column electrode EY and the row electrode EX transition in the same direction, and the applied voltage of the region R transitions according to the amplitude of one electrode at the timings t52, t53, t55, and t56 when the voltage of one electrode (the row electrode EX or the column electrode EY) transitions.

Therefore, at each of the transition timings t52, t53, t55, and t56, the voltage applied to the light-transmitting regions R(1,2) to R(4,2) and R(1,3) to R(4,3) is suppressed to have a variation width of less than 4. At each of the transition timings t52, t53, t55, and t56, the voltage applied to the light-transmitting regions R(1,2) to R(4,2) and R(1,3) to R(4,3) may be suppressed to have a variation width of 2 or less. FIG. 18 exemplifies a case where the variation width of the voltage applied to the regions R(1,2) to R(4,2) and R(1,3) to R(4,3) is approximately 2.

At this time, although the column electrode EY1 straddles the light-shielding region R(1,1) and the light-transmitting regions R(1,2) and R(1,3), a variation width of the voltage applied to the light-transmitting regions R(1,2) and R(1,3) can be suppressed, and the voltage of the light-shielding region R(1,1) can be stabilized. As a result, external light in the light-shielding region R(1,1) can be effectively attenuated. Similarly, although the column electrode EY4 straddles the light-shielding region R(4,1) and the light-transmitting regions R(4,2) and R(4,3), a variation width of the voltage applied to the light-transmitting regions R(4,2) and R(4,3) can be suppressed, and the voltage of the light-shielding region R(4,1) can be stabilized. As a result, external light in the light-shielding region R(4,1) can be effectively attenuated.

Note that the effective values of the voltages applied to the regions R(1,2) to R(4,2) and R(1,3) to R(4,3) in the dimming layer 21 are √(16/6), respectively.

As described above, in the fifth embodiment, the dimming device 1 adopts a voltage waveform in which transition timings do not overlap as a voltage waveform to be supplied to the column electrode and the row electrode corresponding to the on-state region. Accordingly, the dimming device 1 can suppress the voltage applied to the light-transmitting region R at each transition timing to have the variation width of less than 4. The dimming device 1 may suppress the voltage applied to the light-transmitting region R at each transition timing to have the variation width of 2 or less.

Therefore, when the column electrode EY straddles the light-shielding region and the light-transmitting region or the row electrode EX straddles the light-shielding region and the light-transmitting region, the variation width of the voltage applied to the light-transmitting region R can be suppressed, and the voltage of the light-shielding region R can be stabilized. As a result, for example, when the transmittance change characteristic (see FIG. 5) has hysteresis, the transmittance in the off state can be suppressed to be low, and the external light in the light-shielding region R can be effectively attenuated.

Note that each of the voltage waveform v(1,t) to the voltage waveform v(2,t) illustrated in FIG. 16 is line-symmetric with the original waveform with respect to the straight line of the voltage level 0 when shifted by half cycle. Focusing on this point, similarly to the second embodiment, one frame period T may be divided into two frame periods T_n and T_p in which the polarity of the voltage waveform is inverted, each voltage waveform may also be divided into two waveforms of the first half and the second half, and the polarity signal POL indicating the polarity of the frame period T may be additionally introduced accordingly. In the dimming device 1, a waveform of one polarity of the two polarities is set in advance, and a waveform of the other polarity is generated from a waveform of one polarity according to the polarity signal POL. As a result, the information amount of the voltage waveform set in advance in the dimming device 1 can be reduced, and the circuit scale of the circuit (for example, arithmetic circuit 5, column electrode drive circuit 4, and row electrode drive circuit 3) in which the voltage waveform is set in advance can be reduced. As a result, the cost of the dimming device 1 can be reduced. In addition, in each voltage waveform, since the number of times the voltage becomes positive and the number of times the voltage becomes negative can be equalized, generation of residual charges in each row electrode and each column electrode can be suppressed.

Sixth Embodiment

Next, a dimming device 1 according to a sixth embodiment will be described. Hereinafter, differences from the first to fifth embodiments will be mainly described.

As the voltage waveform to be supplied to the column electrode and the row electrode corresponding to the on-state region, a voltage waveform in which transition timings do not overlap is exemplified in the fifth embodiment, but a voltage waveform in which transition timings in the same direction may overlap and transition timings in opposite directions do not overlap is exemplified in the sixth embodiment.

Figure 19:
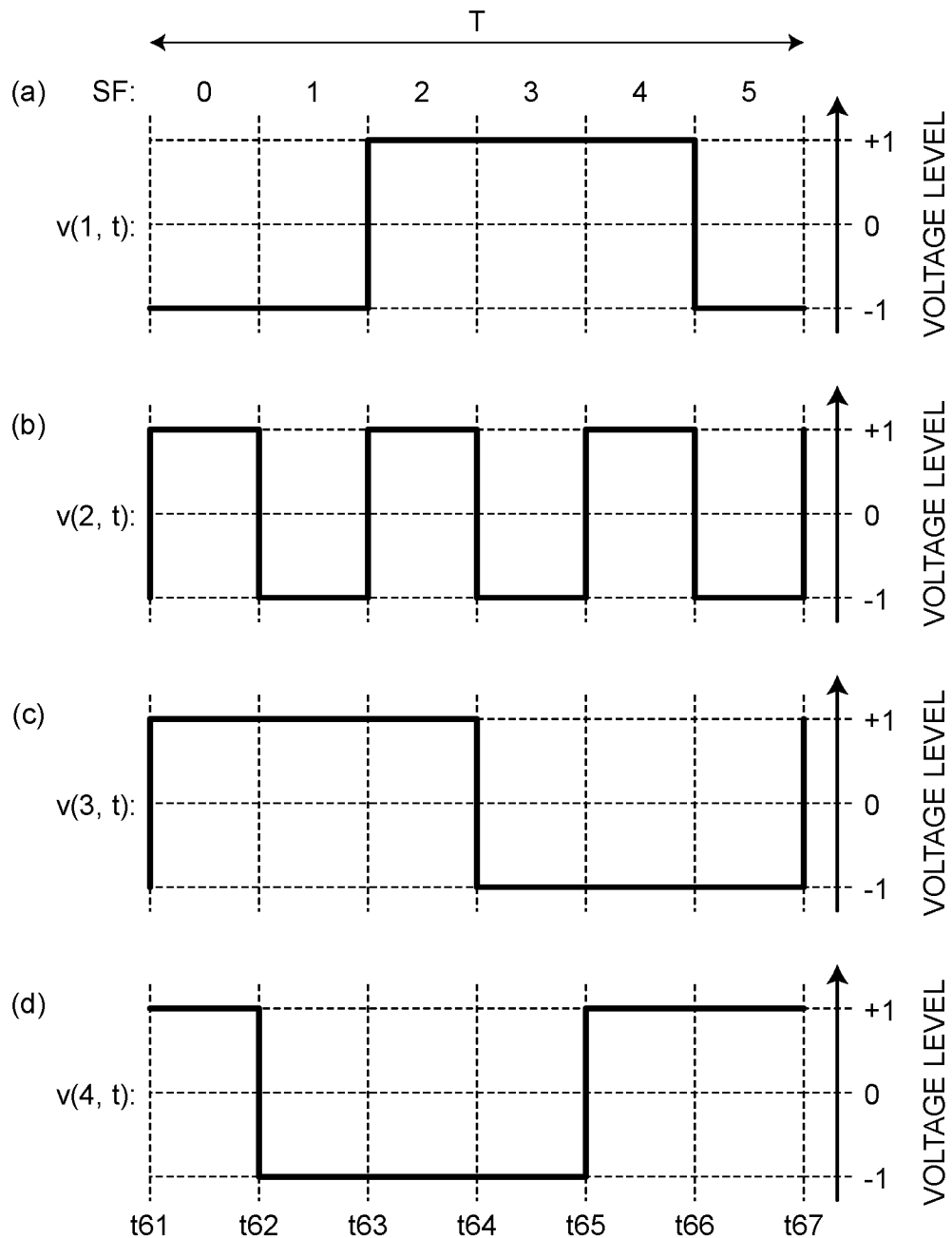
FIG. 19 is a waveform diagram illustrating voltage waveforms to be supplied to a column electrode and a row electrode in a sixth embodiment.

For example, in the procedure (1), the dimming device 1 may prepare a voltage waveform in which transition timings in the same direction may overlap and transition timings in opposite directions do not overlap. In the case of P=4, four types of voltage waveforms v(1,t) to v(4,t) illustrated in FIG. 19 can be prepared as candidate voltage waveforms. FIG. 19 is a waveform diagram illustrating a voltage waveform v to be supplied to the column electrode EY and the row electrode EX in the sixth embodiment.

In the waveform v(1,t), the voltage transits from (−1) to (+1) at timing t63, and the voltage transits from (+1) to (−1) at timing t66.

In the waveform v(2,t), the voltage transits from (−1) to (+1) at timing t61, the voltage transits from (+1) to (−1) at timing t62, the voltage transits from (−1) to (+1) at the timing t63, the voltage transits from (+1) to (−1) at timing t64, the voltage transits from (−1) to (+1) at timing t65, and the voltage transits from (+1) to (−1) at the timing t66.

In the waveform v(3,t), the voltage transits from (−1) to (+1) at the timing t61, and the voltage transits from (+1) to (−1) at timing t64.

In the waveform v(4,t), the voltage transits from (+1) to (−1) at the timing t62, and the voltage transits from (−1) to (+1) at the timing t65.

The transition timing t61 of the waveform v(2,t) and the transition timing t61 of the waveform v(3,t) overlap in the same direction. The transition timing t62 of the waveform v(2,t) and the transition timing t62 of the waveform v(4,t) overlap in the same direction. The transition timing t63 of the waveform v(1,t) and the transition timing t63 of the waveform v(2,t) overlap in the same direction. The transition timing t64 of the waveform v(2,t) and the transition timing t64 of the waveform v(3,t) overlap in the same direction. The transition timing t65 of the waveform v(2,t) and the transition timing t65 of the waveform v(4,t) overlap in the same direction. The transition timing t66 of the waveform v(1,t) and the transition timing t66 of the waveform v(2,t) overlap in the same direction. Transition timings of other combinations do not overlap.

At this time, the dimming pattern as illustrated in FIG. 4 may be adopted. Similarly to the first embodiment, the voltage waveform v(4,t), the voltage waveform v(1,t), and the voltage waveform v(3,t) are assigned to the row electrodes EX1, EX2, and EX3, respectively. The voltage waveform v(4,t), the voltage waveform v(4,t), the voltage waveform v(2,t), and the voltage waveform v(3,t) are assigned to the column electrodes EY1, EY2, EY3, and EY4, respectively.

As a result, in order to supply the same voltage waveform in all the light-shielding regions, the voltages applied to the regions R(1,1), R(2,1), and R(4,3) are maintained at substantially zero in terms of time.

In any of the light-transmitting regions, at each transition timing, the voltages of both electrodes (the row electrode EX and the column electrode EY) transition in the same direction, or the voltage of one electrode (the row electrode EX or the column electrode EY) transitions.

For example, in the light-transmitting region R(3,1), as illustrated in FIGS. 19(b) and 19(d), the voltages of both electrodes EX1 and EY3 transition in the same direction at the transition timings t62 and t65, and the voltage of one electrode EY3 transitions at transition timings t61, t63, t64, and t67.

Figure 20:
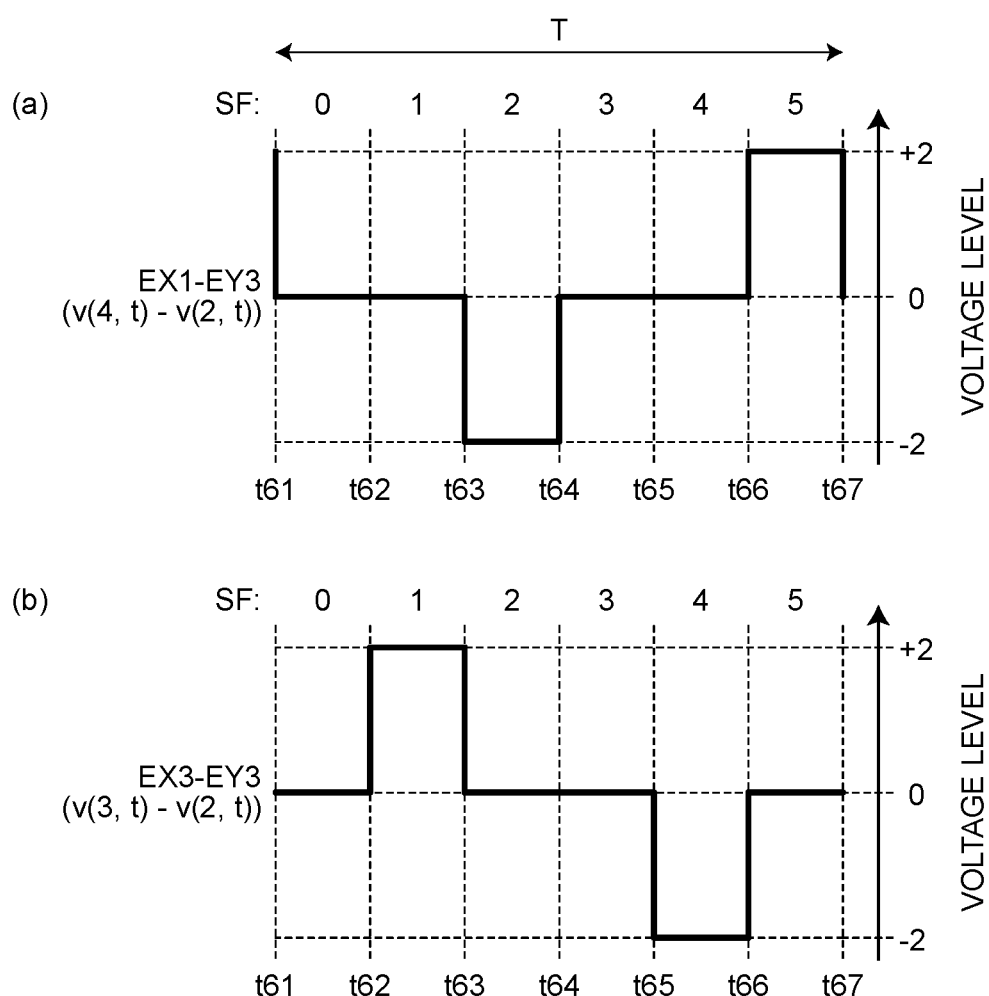
FIG. 20 is a waveform diagrams illustrating an applied voltage of a dimming layer in a sixth embodiment.

Therefore, at each of the transition timings t61, t63, t64, t66, and t67 illustrated in FIG. 20(a), the voltage applied to the light-transmitting region R(3,1) is suppressed to have a variation width of less than 4. FIG. 20 is a waveform diagram illustrating a voltage applied to the dimming layer 21 in the sixth embodiment. At each of the transition timings t61, t63, t64, t66, and t67, the voltage applied to the light-transmitting region R(3,1) may be suppressed to have a variation width of 2 or less. FIG. 20(a) illustrates a case where the variation width of the voltage applied to the region R(3,1) is approximately 2.

At this time, although the row electrode EX1 illustrated in FIG. 4 straddles the light-shielding regions R(1,1) and R(2,1) and the light-transmitting regions R(3,1) and R(4,1), a variation width of the voltage applied to the light-transmitting region R(3,1) can be suppressed, and the voltages of the light-shielding regions R(1,1) and R(2,1) can be stabilized. As a result, external light in the light-shielding regions R(1,1) and R(2,1) can be effectively attenuated.

Similarly, in the light-transmitting region R(3,3), as illustrated in FIGS. 19(b) and 19(c), the voltages of both electrodes EX1 and EY3 transition in the same direction at the transition timings t61 and t64, and the voltage of one electrode EY3 transitions at the transition timings t62, t63, t65, t66, and t67.

Therefore, at each of the transition timings t62, t63, t65, and t66 illustrated in FIG. 20(b), the voltage applied to the light-transmitting region R(3,3) is suppressed to have a variation width of less than 4. At each of the transition timings t61, t63, t64, t66, and t67, the voltage applied to the light-transmitting region R(3,3) may be suppressed to have a variation width of 2 or less. FIG. 20(b) illustrates a case where the variation width of the voltage applied to the region R(3,3) is approximately 2.

At this time, although the row electrode EX3 illustrated in FIG. 4 straddles the light-transmitting regions R(1,3), R(2, 3), and R(3,3) and the light-shielding region R(4,3), the variation width of the voltage applied to the light-transmitting region R(3,3) can be suppressed, and the voltage of the light-shielding region R(4,3) can be stabilized. As a result, external light in the light-shielding region R(4,3) can be effectively attenuated.

Note that the effective value of the voltage applied to each light-transmitting region R in the dimming layer 21 is √(8/6).

As described above, in the sixth embodiment, the dimming device 1 adopts the voltage waveform in which the transition timings in the same direction may overlap each other and the transition timings in opposite directions do not overlap each other as the voltage waveform to be supplied to the column electrode and the row electrode corresponding to the on-state region. Accordingly, the dimming device 1 can suppress the voltage applied to the light-transmitting region R at each transition timing to have the variation width of less than 4. The dimming device 1 may suppress the voltage applied to the light-transmitting region R at each transition timing to have the variation width of 2 or less. Therefore, when the column electrode EY straddles the light-shielding region and the light-transmitting region or the row electrode EX straddles the light-shielding region and the light-transmitting region, the variation width of the voltage applied to the light-transmitting region R can be suppressed, and the voltage of the light-shielding region R can be stabilized. As a result, for example, when the transmittance change characteristic (see FIG. 5) has hysteresis, the transmittance in the off state can be suppressed to be low, and the external light in the light-shielding region R can be effectively attenuated.

Note that each of the voltage waveform v(1,t) to the voltage waveform v(4,t) illustrated in FIG. 19 is line-symmetric with the original waveform with respect to the straight line of the voltage level 0 when shifted by half cycle. Focusing on this point, similarly to the second embodiment, one frame period T may be divided into two frame periods T_n and T_p in which the polarity of the voltage waveform is inverted, each voltage waveform may also be divided into two waveforms of the first half and the second half, and the polarity signal POL indicating the polarity of the frame period T may be additionally introduced accordingly. In the dimming device 1, a waveform of one polarity of the two polarities is set in advance, and a waveform of the other polarity is generated from a waveform of one polarity according to the polarity signal POL. As a result, the information amount of the voltage waveform set in advance in the dimming device 1 can be reduced, and the circuit scale of the circuit (for example, arithmetic circuit 5, column electrode drive circuit 4, and row electrode drive circuit 3) in which the voltage waveform is set in advance can be reduced. As a result, the cost of the dimming device 1 can be reduced. In addition, in each voltage waveform, since the number of times the voltage becomes positive and the number of times the voltage becomes negative can be equalized, generation of residual charges in each row electrode and each column electrode can be suppressed.

Figure 21:
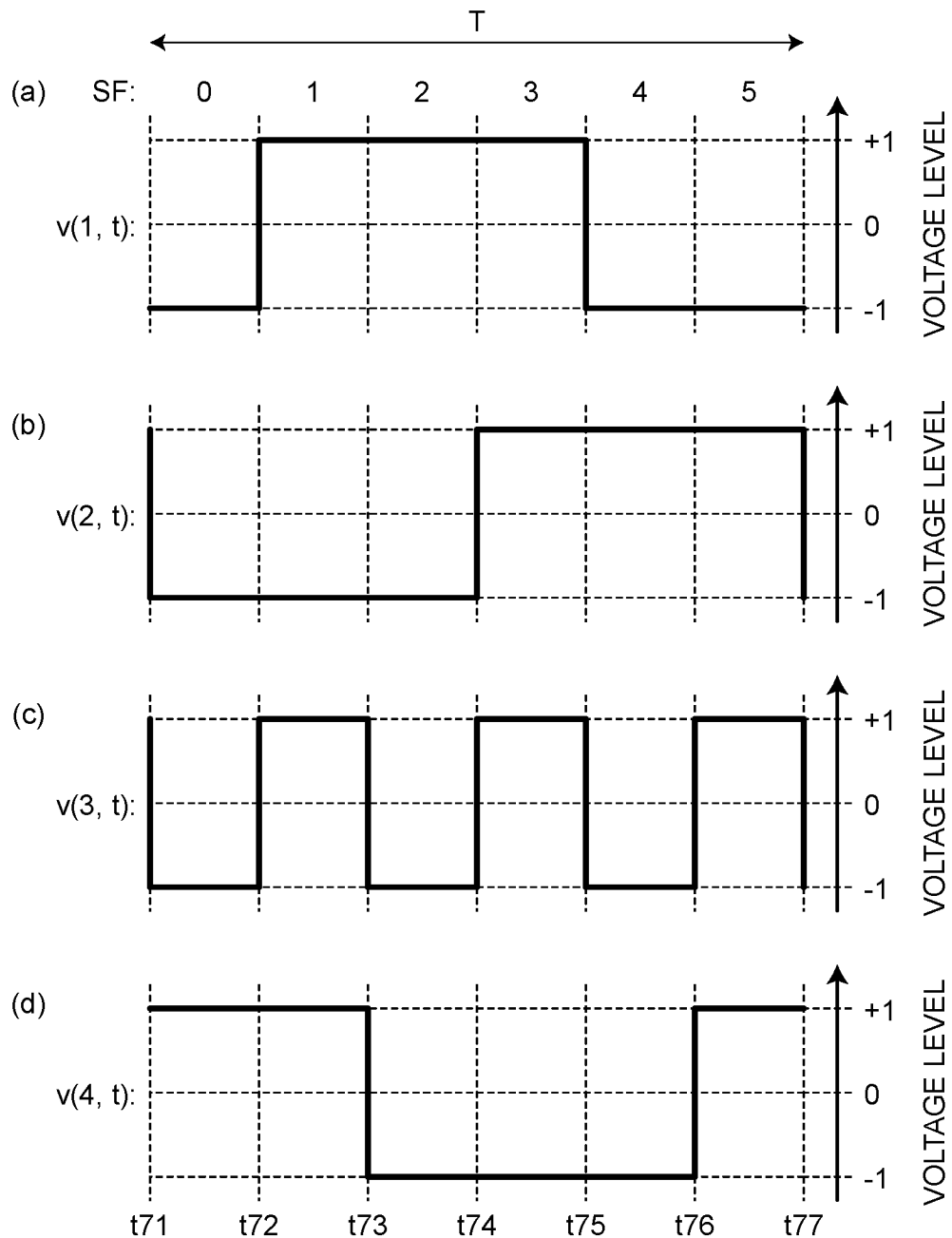
FIG. 21 is a waveform diagram illustrating voltage waveforms to be supplied to a column electrode and a row electrode in a modification of the sixth embodiment.

In addition, in Procedure (1), the dimming device 1 may prepare voltage waveforms v(1,t) to v(4,t) illustrated in FIG. 19 as candidate voltage waveforms instead of the voltage waveforms v(1,t) to v(4,t) illustrated in FIG. 21. FIG. 21 is a waveform diagram illustrating a voltage waveform v to be supplied to a column electrode EY and a row electrode EX according to a modification of the sixth embodiment.

In the waveform v(1,t), the voltage transits from (−1) to (+1) at timing t72, and the voltage transits from (+1) to (−1) at timing t75.

In the waveform v(2,t), the voltage transits from (+1) to (−1) at timing t71, and the voltage transits from (−1) to (+1) at timing t74.

In the waveform v(3,t), the voltage transits from (+1) to (−1) at timing t71, the voltage transits from (−1) to (+1) at timing t72, the voltage transits from (+1) to (−1) at timing t73, the voltage transits from (−1) to (+1) at timing t74, the voltage transits from (+1) to (−1) at timing t75, and the voltage transits from (−1) to (+1) at timing t76.

In the waveform v(4,t), the voltage transits from (+1) to (−1) at timing t73, and the voltage transits from (−1) to (+1) at timing t76.

In any of the light-transmitting regions, the applied voltage of the region R is substantially 0 at the timing when the voltages to the column electrode EY and the row electrode EX illustrated in FIG. 21 transition in the same direction, and the applied voltage of the region R transitions according to the amplitude of one electrode at the timings t71, t72, t73, t74, t75, and t76 when the voltage of one electrode (the row electrode EX or the column electrode EY) transitions.

Even with such a candidate voltage waveform, the dimming device 1 can suppress the voltage applied to the light-transmitting region R at each transition timing to have a variation width of less than 4. The dimming device 1 may suppress the voltage applied to the light-transmitting region R at each transition timing to have the variation width of 2 or less.

In addition, each of the voltage waveform v(1,t) to the voltage waveform v(4,t) illustrated in FIG. 21 is line-symmetric with the original waveform with respect to the straight line of the voltage level 0 when shifted by half cycle. Focusing on this point, similarly to the second embodiment, one frame period T may be divided into two frame periods T_n and T_p in which the polarity of the voltage waveform is inverted, each voltage waveform may also be divided into two waveforms of the first half and the second half, and the polarity signal POL indicating the polarity of the frame period T may be additionally introduced accordingly. In the dimming device 1, a waveform of one polarity of the two polarities is set in advance, and a waveform of the other polarity is generated from a waveform of one polarity according to the polarity signal POL. As a result, the information amount of the voltage waveform set in advance in the dimming device 1 can be reduced, and the circuit scale of the circuit (for example, arithmetic circuit 5, column electrode drive circuit 4, and row electrode drive circuit 3) in which the voltage waveform is set in advance can be reduced. As a result, the cost of the dimming device 1 can be reduced. In addition, in each voltage waveform, since the number of times the voltage becomes positive and the number of times the voltage becomes negative can be equalized, generation of residual charges in each row electrode and each column electrode can be suppressed.

Seventh Embodiment

Next, a dimming device 1 according to a seventh embodiment will be described. Hereinafter, differences from the first to sixth embodiments will be mainly described.

In the fifth embodiment, two types (P=2) of voltage waveforms v are exemplified as the voltage waveforms in which the transition timings in at least opposite directions do not overlap each other. In the sixth embodiment, four types (P=4) of voltage waveforms v are exemplified. In the seventh embodiment, five types (P=5) of voltage waveforms v are exemplified.

When the number of regions R partitioned in a matrix form by the dimming layer 21 is increased, it is expected that the light-transmitting region and the light-shielding region can be more finely controlled, and the dimming performance of the dimming device 1 can be improved. At this time, the number of types P of the voltage waveform v may be an integer corresponding to the larger value Max (M,N) of the number of rows N and the number of columns M of the plurality of regions R partitioned by the dimming layer 21. Therefore, the number of types P of the voltage waveform v may increase as the number of regions R increases.

Figure 22:
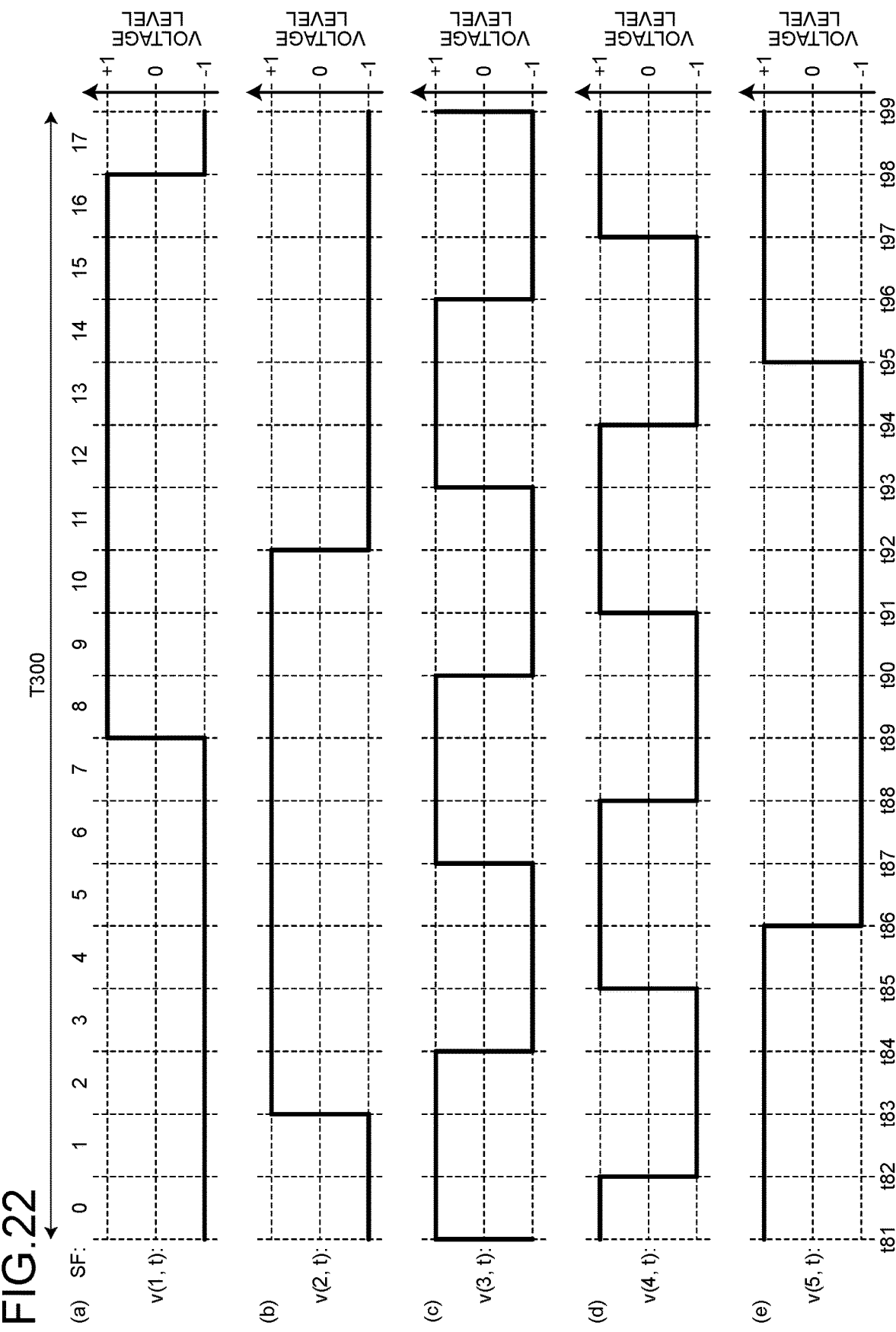
FIG. 22 is a waveform diagram illustrating voltage waveforms to be supplied to a column electrode and a row electrode in a seventh embodiment.

For example, in the case of P=5, five types of voltage waveforms v(1,t) to v(5,t) illustrated in FIG. 22 are prepared as candidate voltage waveforms according to the procedure (1). FIG. 22 is waveform diagrams illustrating a voltage waveform v to be supplied to the column electrode EY and the row electrode EX in the seventh embodiment.

At this time, the number of subframe periods to be included in one frame period is 18 in order to satisfy Mathematical Formula (4) and Mathematical Formula (5) while the five types of voltage waveforms v(1,t) to v(5,t) have patterns of voltage levels temporally different from each other and the transition timings do not overlap.

Then, according to the procedures (2) to (4), these voltage waveforms are assigned to the grouped light-shielding regions and the other regions.

In order to supply the same voltage waveform in any light-shielding region, the effective value of the applied voltage is maintained at substantially 0.

In any of the light-transmitting regions, the applied voltage transitions at the timing when the voltage of one electrode (the row electrode EX or the column electrode EY) transitions. In the light-transmitting region, the applied voltage of the region R transitions according to the amplitude of one electrode at timings t81, t82, t83, t84, t85, t86, t87, t88, t89, t90, t91, t92, t93, t94, t95, t96, t97, and t98 at which the voltage of one electrode (the row electrode EX or the column electrode EY) transitions.

The effective value of the applied voltage in the light-transmitting region is $\sqrt{(40/18)}$ or $\sqrt{(48/18)}$.

As described above, also in the seventh embodiment, the dimming device 1 adopts the voltage waveform in which the transition timings do not overlap as the voltage waveform to be supplied to the column electrode and the row electrode corresponding to the on-state region. Accordingly, the dimming device 1 can suppress the voltage applied to the light-transmitting region R at each transition timing to have the variation width of less than 4. The dimming device 1 may suppress the voltage applied to the light-transmitting region R at each transition timing to have the variation width of 2 or less. Therefore, when the column electrode EY straddles the light-shielding region and the light-transmitting region or the row electrode EX straddles the light-shielding region and the light-transmitting region, the variation width of the voltage applied to the light-transmitting region R can be suppressed, and the voltage of the light-shielding region R can be stabilized. As a result, for example, when the transmittance change characteristic (see FIG. 5) has hysteresis, the transmittance in the off state can be suppressed to be low, and the external light in the light-shielding region R can be effectively attenuated.

Note that each of the voltage waveform v(1,t) to the voltage waveform v(5,t) illustrated in FIG. 22 is line-symmetric with the original waveform with respect to the straight line of the voltage level 0 when shifted by a half cycle (=T300/2). Focusing on this point, similarly to the second embodiment, one frame period T300 may be divided into two frame periods T300_n and T300_p in which the polarity of the voltage waveform is inverted, each voltage waveform may also be divided into two waveforms of the first half and the second half, and a polarity signal POL indicating the polarity of the frame period T300 may be additionally introduced accordingly. In the dimming device 1, a waveform of one polarity of the two polarities is set in advance, and a waveform of the other polarity is generated from a waveform of one polarity according to the polarity signal POL. As a result, the information amount of the voltage waveform set in advance in the dimming device 1 can be reduced, and the circuit scale of the circuit (for example, arithmetic circuit 5, column electrode drive circuit 4, and row electrode drive circuit 3) in which the voltage waveform is set in advance can be reduced. As a result, the cost of the dimming device 1 can be reduced. In addition, in each voltage waveform, since the number of times the voltage becomes positive and the number of times the voltage becomes negative can be equalized, generation of residual charges in each row electrode and each column electrode can be suppressed.

Eighth Embodiment

Next, a dimming device 101 according to an eighth embodiment will be described. Hereinafter, differences from the first to seventh embodiments will be mainly described.

In the first to seventh embodiments, the configuration in which the region R to be dimmed by the dimming panel 2 is partitioned in one stage is exemplified, but in the eighth embodiment, a configuration in which the region R to be dimmed by a dimming panel 102 is partitioned in two stages is exemplified.

Figure 23:
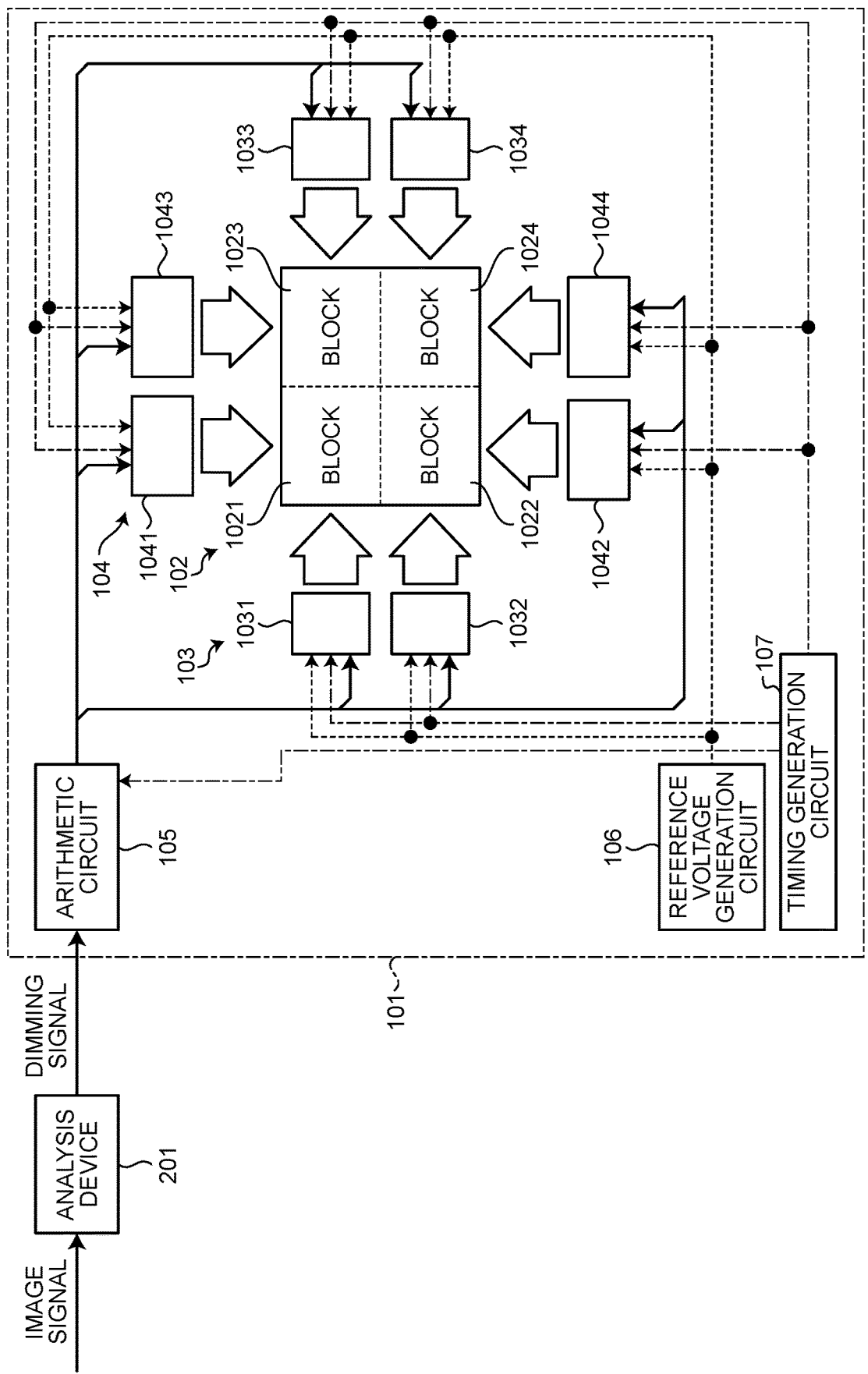
FIG. 23 is a block diagram illustrating a schematic configuration of a dimming device according to an eighth embodiment.

The dimming device 101 can be configured as illustrated in FIG. 23. FIG. 23 is a block diagram illustrating a configuration of the dimming device 101.

The dimming device 101 includes a dimming panel 102, a row electrode drive circuit group 103, a column electrode drive circuit group 104, an arithmetic circuit 105, a reference voltage generation circuit 106, and a timing generation circuit 7.

The dimming panel 102 includes a plurality of blocks 1021 to 1024 partitioned in a matrix. Each row extends in the X direction, and each column extends in the Y direction. The row electrode drive circuit group 103 includes a plurality of row electrode drive circuits 1031 to 1034 corresponding to the plurality of blocks 1021 to 1024. The column electrode drive circuit group 104 includes a plurality of column electrode drive circuits 1041 to 1044 corresponding to the plurality of blocks 1021 to 1024.

Figure 24:
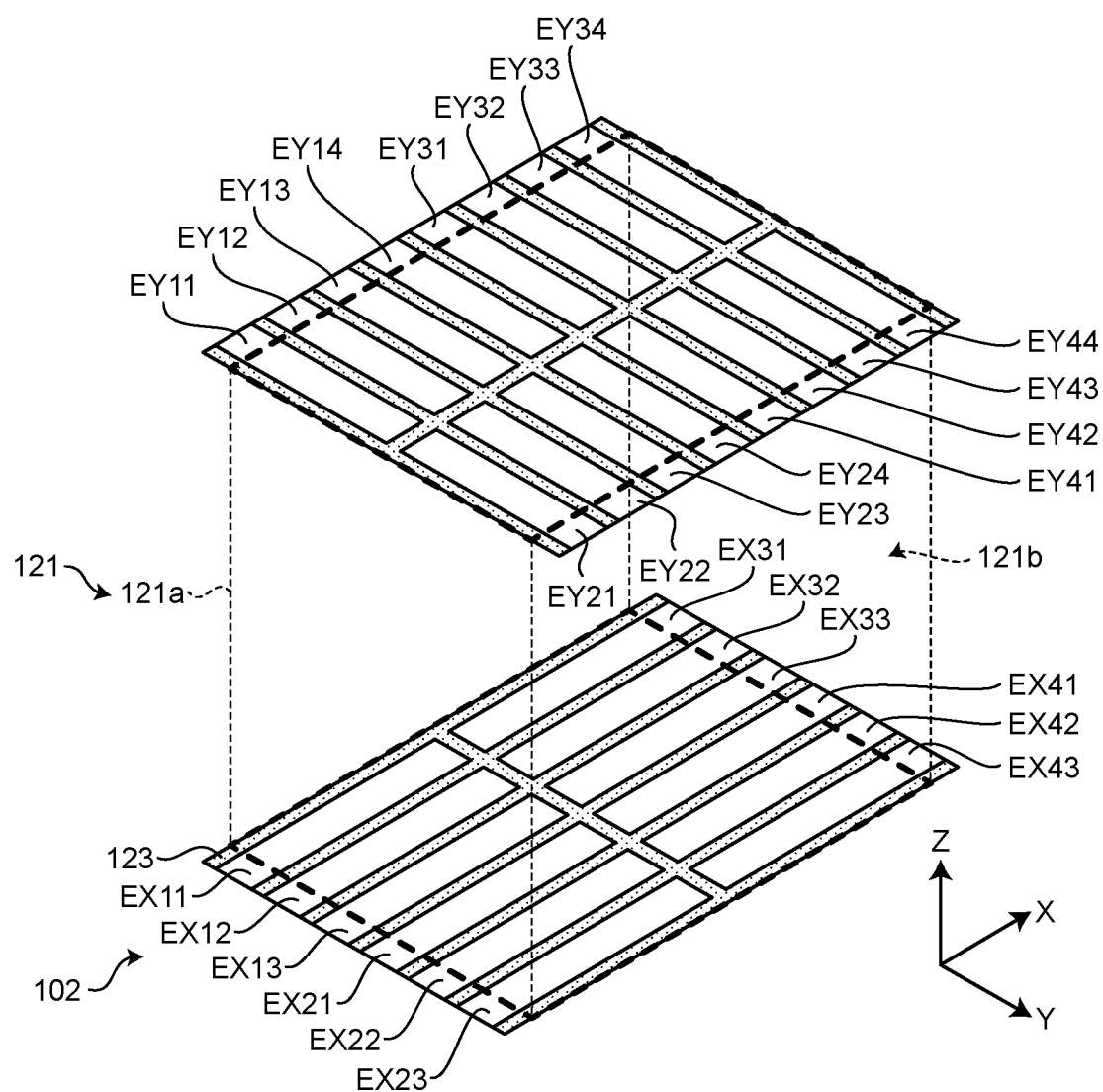
FIG. 24 is a plan view illustrating a configuration of a column electrode and a row electrode in the eighth embodiment.

As illustrated in FIG. 24, the dimming panel 102 includes a dimming layer 121, a plurality of column electrodes EY11 to EY14, column electrodes EY21 to EY24, column electrodes EY31 to EY34, column electrodes EY41 to EY44, and a plurality of row electrodes EX11 to EX13, row electrodes EX21 to EX23, row electrodes EX31 to EX33, and row electrodes EX41 to EX43. FIG. 24 is a perspective view illustrating a configuration of the dimming panel 102.

The plurality of row electrodes EX11 to EX13 face the plurality of column electrodes EY11 to EY14 with the dimming layer 121 therebetween. The plurality of row electrodes EX21 to EX23 face the plurality of column electrodes EY21 to EY24 with the dimming layer 121 therebetween. The plurality of row electrodes EX31 to EX33 face the plurality of column electrodes EY31 to EY34 with the dimming layer 121 therebetween. The plurality of row electrodes EX41 to EX43 face the plurality of column electrodes EY41 to EY44 with the dimming layer 121 therebetween.

Figure 25A:
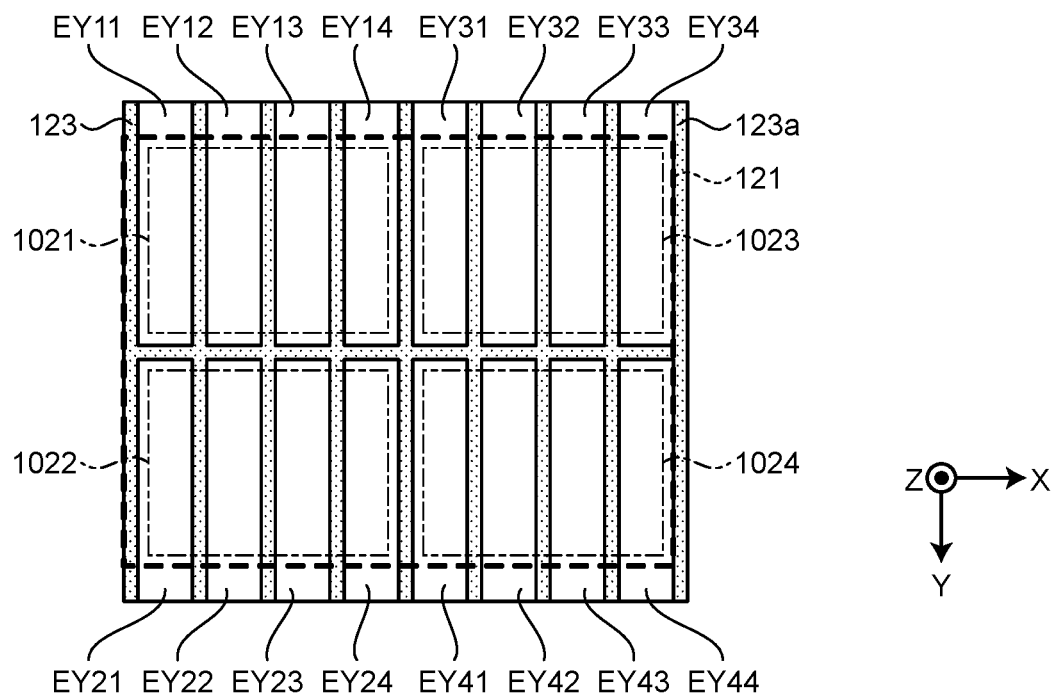
FIGS. 25A and 25B is a perspective view illustrating arrangement of a column electrode, a dimming panel, and a row electrode in the eighth embodiment.

As illustrated in FIG. 25A, on a substrate 123, the plurality of column electrodes EY11 to EY14 and the plurality of column electrodes EY31 to EY34 are insulated from each other by an insulating portion 123a and are arranged in the X direction. As a result, the plurality of column electrodes EY11 to EY14 and the plurality of column electrodes EY31 to EY34 are arranged in the X direction along the front surface of the dimming layer 121. The plurality of column electrodes EY21 to EY24 and the plurality of column electrodes EY41 to EY44 are disposed on the +Y side with respect to the plurality of column electrodes EY11 to EY14 and the plurality of column electrodes EY31 to EY34, and are insulated from each other by the insulating portion 123a. The plurality of column electrodes EY21 to EY24 and the plurality of column electrodes EY41 to EY44 are insulated from each other by the insulating portion 123a and are arranged in the X direction. As a result, the plurality of column electrodes EY21 to EY24 and the plurality of column electrodes EY41 to EY44 are arranged in the X direction along the front surface of the dimming layer 121. On the substrate 123, each column electrode EY extends in the Y direction.

Figure 25B:
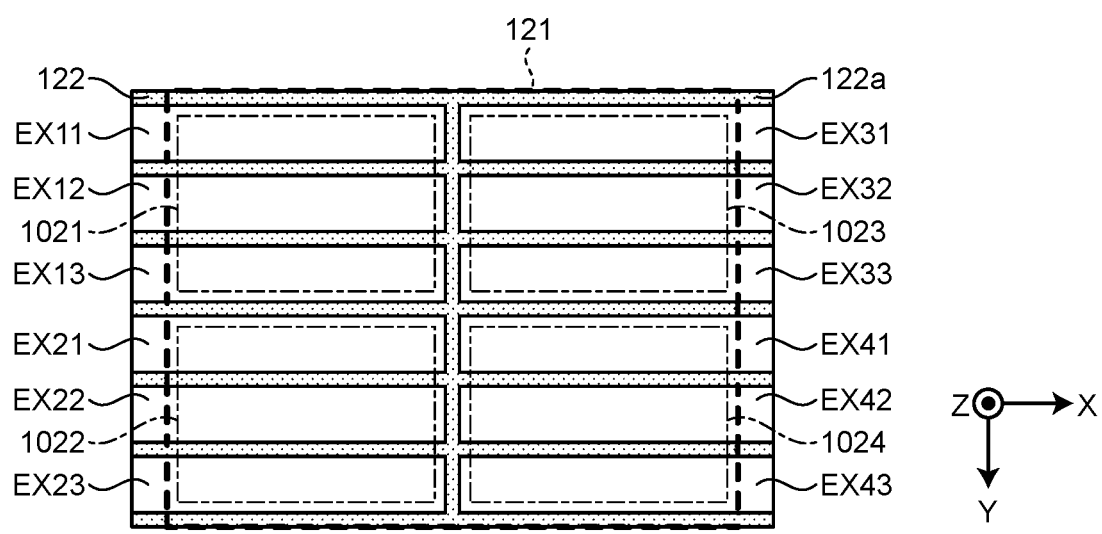

As illustrated in FIG. 25B, on a substrate 122, the plurality of row electrodes EX11 to EX13 and row electrodes EX21 to EX23 are insulated from each other by an insulating portion 122a and are arranged in the Y direction. As a result, the plurality of row electrodes EX11 to EX13 and the plurality of row electrodes EX21 to EX23 are arranged in the Y direction along the back surface of the dimming layer 121. The plurality of row electrodes EX31 to EX33 and the plurality of row electrodes EX41 to EX43 are disposed on the +X side with respect to the plurality of row electrodes EX11 to EX13 and the row electrodes EX21 to EX23, and are insulated from each other by the insulating portion 123a. The plurality of row electrodes EX31 to EX33 and the row electrodes EX41 to EX43 are insulated from each other by the insulating portion 122a and are arranged in the Y direction. As a result, the plurality of row electrodes EX31 to EX33 and the plurality of row electrodes EX41 to EX43 are arranged in the Y direction along the back surface of the dimming layer 121. On the substrate 122, each row electrode EX extends in the X direction.

Figure 26:
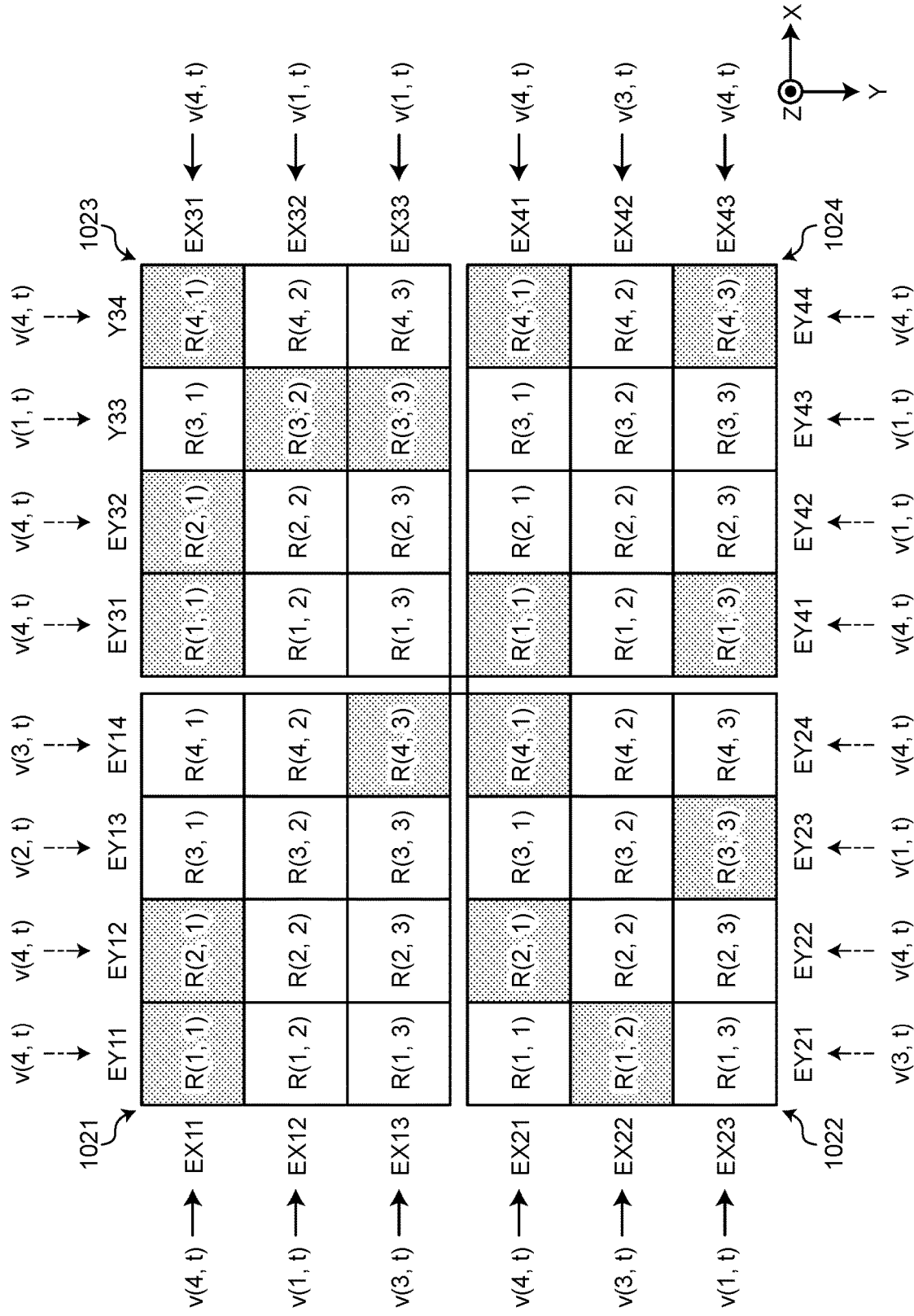
FIG. 26 is a plan view illustrating a dimming pattern of a dimming panel in the eighth embodiment.

In the block 1021, in the dimming layer 121 illustrated in FIG. 24, the plurality of regions R(1,1) to R(4,3) as illustrated in FIG. 26 are partitioned at a plurality of intersection positions of the plurality of column electrodes EY11 to EY14 and the plurality of row electrodes EX11 to EX13.

FIG. 26 is a plan view illustrating a plurality of regions R(1,1) to R(4,3) partitioned by the dimming panel 102.

In the block 1022, in the dimming layer 121 illustrated in FIG. 24, the plurality of regions R(1,1) to R(4,3) as illustrated in FIG. 26 are partitioned at a plurality of intersection positions of the plurality of column electrodes EY21 to EY24 and the plurality of row electrodes EX21 to EX23.

In the block 1023, in the dimming layer 121 illustrated in FIG. 24, the plurality of regions R(1,1) to R(4,3) as illustrated in FIG. 26 are partitioned at a plurality of intersection positions of the plurality of column electrodes EY31 to EY34 and the plurality of row electrodes EX31 to EX33.

In the block 1024, in the dimming layer 121 illustrated in FIG. 24, the plurality of regions R(1,1) to R(4,3) as illustrated in FIG. 26 are partitioned at a plurality of intersection positions of the plurality of column electrodes EY41 to EY44 and the plurality of row electrodes EX41 to EX43.

The reference voltage generation circuit 106 illustrated in FIG. 23 is electrically connected to each of the plurality of row electrode drive circuits 1031 to 1034 and the plurality of column electrode drive circuits 1041 to 1044. The reference voltage generation circuit 6 supplies a reference voltage to each of the plurality of row electrode drive circuits 1031 to 1034 and the plurality of column electrode drive circuits 1041 to 1044. The reference voltage generation circuit 6 may supply the first reference voltage and the second reference voltage to the plurality of row electrode drive circuits 1031 to 1034 and the plurality of column electrode drive circuits 1041 to 1044, respectively.

The timing generation circuit 7 is electrically connected to the arithmetic circuit 105, the plurality of row electrode drive circuits 1031 to 1034, and the plurality of column electrode drive circuits 1041 to 1044. A timing generation circuit 107 supplies a clock signal to each of the arithmetic circuit 105, the plurality of row electrode drive circuits 1031 to 1034, and the plurality of column electrode drive circuits 1041 to 1044.

The arithmetic circuit 5 is electrically connected between the analysis device 201, the plurality of row electrode drive circuits 1031 to 1034, and the plurality of column electrode drive circuits 1041 to 1044. In synchronization with the clock signal, the arithmetic circuit 5 generates the column control signal corresponding to the dimming signal and supplies the column control signal to each of the plurality of column electrode drive circuits 1041 to 1044, and generates the row control signal corresponding to the dimming signal and supplies the row control signal to each of the plurality of row electrode drive circuits 1031 to 1034. The column control signal includes an instruction of a voltage waveform to be supplied to each column electrode EY. The row control signal includes an indication of a voltage waveform to be supplied to each row electrode EX.

The column electrode drive circuit 1041 is electrically connected to the plurality of column electrodes EY11 to EY14. The column electrode drive circuit 1041 drives the plurality of column electrodes EY11 to EY14 with a voltage waveform corresponding to the column control signal using the reference voltage in synchronization with the clock signal. The column electrode drive circuit 1041 can individually drive the plurality of column electrodes EY11 to EY14. The column electrode drive circuit 1041 selects one of the first reference voltage and the second reference voltage according to the column control signal. The column electrode drive circuit 1041 can supply the selected reference voltage to the column electrodes EY11 to EY14 in synchronization with the clock signal.

The column electrode drive circuit 1042 is electrically connected to the plurality of column electrodes EY21 to EY24. The column electrode drive circuit 1042 drives the plurality of column electrodes EY21 to EY24 with a voltage waveform corresponding to the column control signal using the reference voltage in synchronization with the clock signal. The column electrode drive circuit 1042 can individually drive the plurality of column electrodes EY21 to EY24. The column electrode drive circuit 1042 selects one of the first reference voltage and the second reference voltage according to the column control signal. The column electrode drive circuit 1042 can supply the selected reference voltage to the column electrodes EY21 to EY24 in synchronization with the clock signal.

The column electrode drive circuit 1043 is electrically connected to the plurality of column electrodes EY31 to EY34. The column electrode drive circuit 1043 drives the plurality of column electrodes EY31 to EY34 with a voltage waveform corresponding to the column control signal using the reference voltage in synchronization with the clock signal. The column electrode drive circuit 1043 can individually drive the plurality of column electrodes EY31 to EY34. The column electrode drive circuit 1043 selects one of the first reference voltage and the second reference voltage according to the column control signal. The column electrode drive circuit 1043 can supply the selected reference voltage to the column electrodes EY31 to EY34 in synchronization with the clock signal.

The column electrode drive circuit 1044 is electrically connected to the plurality of column electrodes EY41 to EY44. The column electrode drive circuit 1044 drives the plurality of column electrodes EY41 to EY44 with a voltage waveform corresponding to the column control signal using the reference voltage in synchronization with the clock signal. The column electrode drive circuit 1044 can individually drive the plurality of column electrodes EY41 to EY44. The column electrode drive circuit 1044 selects one of the first reference voltage and the second reference voltage according to the column control signal. The column electrode drive circuit 1044 can supply the selected reference voltage to the column electrodes EY41 to EY44 in synchronization with the clock signal.

The row electrode drive circuit 1031 is electrically connected to the plurality of row electrodes EX11 to EX13. The row electrode drive circuit 1031 drives the plurality of row electrodes EX11 to EX13 with a voltage waveform corresponding to the row control signal using the reference voltage in synchronization with the clock signal. The row electrode drive circuit 1031 can individually drive the plurality of row electrodes EX11 to EX13. The row electrode drive circuit 1031 selects one of the first reference voltage and the second reference voltage according to the row control signal. The row electrode drive circuit 1031 can supply the selected reference voltage to the row electrodes EX11 to EX13 in synchronization with the clock signal.

The row electrode drive circuit 1032 is electrically connected to the plurality of row electrodes EX21 to EX23. The row electrode drive circuit 1032 drives the plurality of row electrodes EX21 to EX23 with a voltage waveform corresponding to the row control signal using the reference voltage in synchronization with the clock signal. The row electrode drive circuit 1032 can individually drive the plurality of row electrodes EX21 to EX23. The row electrode drive circuit 1032 selects one of the first reference voltage and the second reference voltage according to the row control signal. The row electrode drive circuit 1032 can supply the selected reference voltage to the row electrodes EX21 to EX23 in synchronization with the clock signal.

The row electrode drive circuit 1033 is electrically connected to the plurality of row electrodes EX31 to EX33. The row electrode drive circuit 1033 drives the plurality of row electrodes EX31 to EX33 with a voltage waveform corresponding to the row control signal using the reference voltage in synchronization with the clock signal. The row electrode drive circuit 1033 can individually drive the plurality of row electrodes EX31 to EX33. The row electrode drive circuit 1033 selects one of the first reference voltage and the second reference voltage according to the row control signal. The row electrode drive circuit 1033 can supply the selected reference voltage to the row electrodes EX31 to EX33 in synchronization with the clock signal.

The row electrode drive circuit 1034 is electrically connected to the plurality of row electrodes EX41 to EX43. The row electrode drive circuit 1034 drives the plurality of row electrodes EX41 to EX43 with a voltage waveform corresponding to the row control signal using the reference voltage in synchronization with the clock signal. The row electrode drive circuit 1034 can individually drive the plurality of row electrodes EX41 to EX43. The row electrode drive circuit 1033 selects one of the first reference voltage and the second reference voltage according to the row control signal. The row electrode drive circuit 1033 can supply the selected reference voltage to the row electrodes EX31 to EX33 in synchronization with the clock signal.

The dimming device 101 can individually drive the plurality of blocks 1021 to 1024, and can individually turn on and off the plurality of regions R(1,1) to R(4,3) included in each of the blocks 1021 to 1024.

As described above, in the eighth embodiment, the dimming device 101 has a configuration in which the region R to be dimmed by the dimming panel 102 is partitioned in two stages, and the plurality of regions R of the plurality of blocks 1021 to 1024 of the dimming panel 102 can be individually turned on and off in two stages. As a result, the two-dimensional degree of freedom of the dimming can be further improved, and the dimming performance of the dimming device 101 can be further improved.

Figure 27:
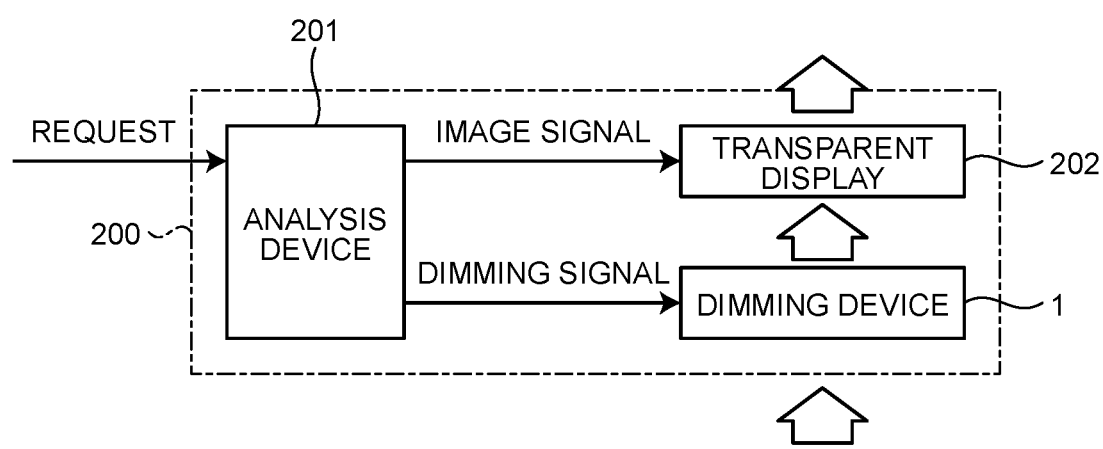
FIG. 27 is a block diagram illustrating a configuration of a display device to which the dimming device according to the first to eighth embodiments is applied.

Note that the dimming device 1 and the dimming device 101 according to the first to eighth embodiments may be applied to a display device 200 as illustrated in FIG. 27. FIG. 27 is a block diagram illustrating a configuration of a display device 200 to which the dimming device according to the first to eighth embodiments is applied.

The display device 200 includes an analysis device 201, a transparent display 202, and a dimming device 1. The dimming device 1 is any of the dimming device 1 and the dimming device 101 according to the first to eighth embodiments. The analysis device 201 may be similar to the analysis device 201 illustrated in FIG. 1.

In the transparent display 202, unit regions having a transparent region and a light emitting region are two-dimensionally arranged. In each light emitting region, a plurality of light emitting pixels (for example, R pixel, G pixel, and B pixel) are arranged. In the R pixel, the G pixel, and the B pixel, emission colors correspond to red (R), green (G), and blue (B), respectively. The transparent display 202 can display an image or transmit external light from the back surface.

The analysis device 201 receives a request related to image display and dimming from a host controller. The analysis device 201 analyzes the request, generates an image signal and supplies the image signal to the transparent display 202, and generates a dimming signal and supplies the dimming signal to the dimming device 1. The transparent display 202 displays a predetermined image on the display screen according to the image signal. The dimming device 1 can individually transmit or shield the plurality of regions R according to the dimming signal.

Figure 28:
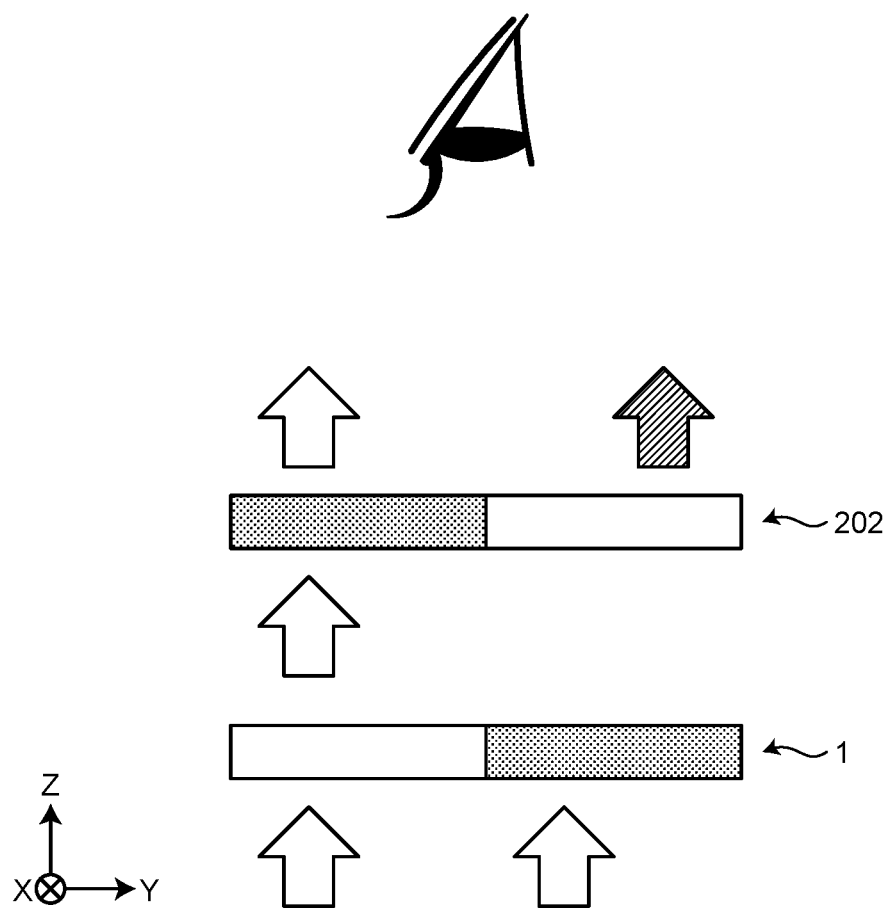
FIG. 28 is a cross-sectional view illustrating the configuration of the display device to which the dimming device according to the first to eighth embodiments is applied.

For example, as illustrated in the YZ cross-sectional view of FIG. 28, in the dimming device 1, the region R on the +Y side is controlled to the light-shielding state, and the region R on the −Y side is controlled to the light-transmitting state. At this time, in the transparent display 202, the image displayed in the region on the +Y side is shielded by the dimming device 1 in the back, so that the image can be favorably viewed by the user in a state where the bright place contrast is improved. Furthermore, in the transparent display 202, when the image is not displayed or is displayed as a black image in the region on the −Y side, the background scene transmitted through the dimming device 1 is further transmitted through the transparent display 202 and can be favorably viewed by the user.

Alternatively, it is assumed that the background illustrated in FIG. 29(*a*) exists behind the display device 200, and as illustrated in the XY plan view of FIG. 29(*b*), in the dimming device 1, the +X side and +Y side regions and the −Y side region having the Y width/4 are controlled to the light-shielding state. At this time, on the transparent display 202, the image displayed in the regions on the +X side and the +Y side is shielded by the dimming device 1 behind the image, so that the image can be favorably viewed by the user in a state where the bright place contrast is improved. Furthermore, in the transparent display 202, the advertisement display displayed in the region of Y width/4 on the −Y side is shielded in the back by the dimming device 1, so that the advertisement display can be favorably viewed by the user in a state where the bright place contrast is improved. In addition, in the other region of the transparent display 202, when the image is non-display or black image display, the background scene transmitted through the dimming device 1 is further transmitted through the transparent display 202 and can be favorably viewed by the user.

Consequently, the image display and the background through display can favorably be performed, and the display performance of display device 200 can be improved.

According to the dimming device and the display device of the present disclosure, dimming performance can be improved.

Supplementary Notes (Item 1) A dimming device including a dimming panel, the dimming panel including:
  a dimming layer that has a plurality of regions partitioned in a matrix;
  a plurality of column electrodes that is arranged in a row direction along a front surface of the dimming layer, each of the column electrodes extending in a column direction; and
  a plurality of row electrodes that faces the plurality of column electrodes with the plurality of regions interposed therebetween and is arranged in the column direction along a back surface of the dimming layer, each of the row electrodes extending in the row direction, in which
  voltages having substantially a same waveform are supplied to a column electrode and a row electrode corresponding to a region of the plurality of regions controlled to a predetermined transmittance, among the plurality of column electrodes and the plurality of row electrodes.

(Item 2) In the dimming device according to Item 1,
  the dimming panel is capable of controlling a light transmittance to a first transmittance or a second transmittance,
  the first transmittance is smaller than the second transmittance, and
  voltages having substantially a same waveform are input to a column electrode and a row electrode corresponding to each of one or more regions of the plurality of regions controlled to the first transmittance, and voltages having waveforms different from each other are supplied to a column electrode and a row electrode corresponding to each of one or more regions of the plurality of regions controlled to the second transmittance, among the plurality of column electrodes and the plurality of row electrodes.

(Item 3) In the dimming device according to Item 2, a voltage applied to a region of the plurality of regions controlled to the first transmittance is substantially constant in terms of time, and a voltage applied to a region of the plurality of regions controlled to the second transmittance is not substantially constant in terms of time.

(Item 4) In the dimming device according to Item 2, an effective voltage applied to a region of the plurality of regions controlled to the first transmittance is substantially zero, and an effective voltage applied to a region of the plurality of regions controlled to the second transmittance is a value larger than zero.

(Item 5) In the dimming device according to Item 4, the value larger than zero is equal between one or more regions controlled to the second transmittance.

(Item 6) In the dimming device according to Item 2, when a voltage amplitude serving as a reference is represented by 1 and a voltage transitioning between −1 and +1 is supplied to each of the column electrode and the row electrode, a variation width of a voltage applied to the one or more regions controlled to the second transmittance is less than 4 at each of a plurality of transition timings.

(Item 7) In the dimming device according to Item 2, when a voltage amplitude serving as a reference is represented by 1 and a voltage transitioning between −1 and +1 is supplied to each of the column electrode and the row electrode, a variation width of a voltage applied to the one or more regions controlled to the second transmittance is 2 or less at each of a plurality of transition timings.

(Item 8) The dimming device according to any one of Items 1 to 5, further including:
  an arithmetic circuit configured to receive a dimming signal specifying a candidate voltage waveform to be supplied to the plurality of column electrodes and a candidate voltage waveform to be supplied to the plurality of row electrodes among a plurality of candidate voltage waveforms, and generate a column control signal and a row control signal according to the dimming signal;
  a column electrode drive circuit configured to drive the plurality of column electrodes according to the column control signal; and
  a row electrode drive circuit configured to drive the plurality of row electrodes according to the row control signal.

(Item 9) In the dimming device according to Item 8,
  a frame period of the dimming device includes two short frame periods in which polarities of voltage waveforms are inverted,
  the arithmetic circuit further generates a polarity signal indicating a polarity of each of the short frame periods, and the column electrode drive circuit drives the plurality of column electrodes according to the column control signal and the polarity signal, and the row electrode drive circuit drives the plurality of row electrodes according to the row control signal and the polarity signal.

(Item 10) The dimming device according to Item 8 or 9, further including:

a reference voltage generation circuit configured to generate a reference voltage and supply the reference voltage to each of the column electrode drive circuit and the row electrode drive circuit.

(Item 11) In the dimming device according to any one of Items 8 to 10, the plurality of candidate voltage waveforms corresponds to an orthogonal function.

(Item 12) In the dimming device according to any one of Items 8 to 11, the dimming layer further includes a plurality of second regions partitioned in a matrix, the dimming panel includes:

a plurality of second column electrodes that is arranged in the row direction along the front surface of the dimming layer, each of the second column electrodes extending in the column direction; and a plurality of second row electrodes that faces the plurality of second column electrodes with the plurality of second regions interposed therebetween and is arranged in the column direction along the back surface of the dimming layer, each of the second row electrodes extending in the row direction, and the dimming device further includes:

a second column electrode drive circuit configured to drive the plurality of second column electrodes according to the column control signal, and a second row electrode drive circuit configured to drive the plurality of second row electrodes according to the row control signal.

(Item 13) A display device including:

a transparent display; and a dimming device that is arranged on a back surface side of the transparent display and is capable of controlling light transmittance, the dimming device comprising a dimming panel, the dimming panel comprising:

a dimming layer that has a plurality of regions partitioned in a matrix;

a plurality of column electrodes that is arranged in a row direction along a front surface of the dimming layer, each of the column electrodes extending in a column direction; and a plurality of row electrodes that faces the plurality of column electrodes with the plurality of regions interposed therebetween and is arranged in the column direction along a back surface of the dimming layer, each of the row electrodes extending in the row direction, wherein voltages having substantially a same waveform are supplied to a column electrode and a row electrode corresponding to a region of the plurality of regions controlled to a predetermined transmittance, among the plurality of column electrodes and the plurality of row electrodes.

(Item 14) A method for driving a dimming device including a dimming panel, the dimming panel including: a dimming layer that has a plurality of regions partitioned in a matrix; a plurality of column electrodes that is arranged in a row direction along a front surface of the dimming layer, each of the column electrodes extending in a column direction; and a plurality of row electrodes that faces the plurality of column electrodes with the plurality of regions interposed therebetween and is arranged in the column direction along a back surface of the dimming layer, each of the row electrodes extending in the row direction, the method including:

supplying voltages having substantially a same waveform to a column electrode and a row electrode corresponding to each of one or more regions of the plurality of regions controlled to a first transmittance among the plurality of column electrodes and the plurality of row electrodes; and supplying voltages having waveforms different from each other to a column electrode and a row electrode corresponding to each of one or more regions of the plurality of regions controlled to a second transmittance among the plurality of column electrodes and the plurality of row electrodes.

(Item 15) In the method for driving the dimming device according to Item 14, a voltage applied to a region of the plurality of regions controlled to the first transmittance is substantially constant in terms of time, and a voltage applied to a region of the plurality of regions controlled to the second transmittance is not substantially constant in terms of time.

(Item 16) In the method for driving the dimming device according to Item 14, an effective voltage applied to a region of the plurality of regions controlled to the first transmittance is substantially zero, and an effective voltage applied to a region of the plurality of regions controlled to the second transmittance is a value larger than zero.

(Item 17) In the method for driving the dimming device according to Item 16, the value larger than zero is equal between one or more regions controlled to the second transmittance.

(Item 18) In the method for driving the dimming device according to any one of Items 14 to 17, when a voltage amplitude serving as a reference is represented by 1 and a voltage transitioning between −1 and +1 is supplied to each of the column electrode and the row electrode, a variation width of a voltage applied to the one or more regions controlled to the second transmittance is less than 4 at each of a plurality of transition timings.

(Item 19) In the method for driving the dimming device according to any one of Items 14 to 17, when a voltage amplitude serving as a reference is represented by 1 and a voltage transitioning between −1 and +1 is supplied to each of the column electrode and the row electrode, a variation width of a voltage applied to the one or more regions controlled to the second transmittance is 2 or less at each of a plurality of transition timings.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A dimming device comprising a dimming panel, the dimming panel comprising:
a dimming layer that has a plurality of regions partitioned in a matrix;
a plurality of column electrodes that is arranged in a row direction along a front surface of the dimming layer, each of the column electrodes extending in a column direction; and
a plurality of row electrodes that faces the plurality of column electrodes with the plurality of regions interposed therebetween and is arranged in the column direction along a back surface of the dimming layer, each of the row electrodes extending in the row direction, wherein;
the dimming panel is capable of controlling a light transmittance to a first transmittance or a second transmittance,
during a frame period, each region interposed between the plurality of column electrodes and the plurality of row electrodes are controlled to either the first transmittance or the second transmittance,
a first group of regions comprises each region controlled to the first transmittance,
a second group of regions comprises each region controlled to the second transmittance,
voltages having substantially a same waveform during the frame period are input to a column electrode and a row electrode corresponding to each of one or more regions within the first group of regions, and voltages having waveforms different from each other during the frame period are supplied to a column electrode and a row electrode corresponding to each of one or more regions within the second group of regions, among the plurality of column electrodes and the plurality of row electrodes,
during the frame period, an effective voltage applied to the each of the one or more regions within the first group of regions is substantially zero, and an amplitude of an effective voltage applied to the each of the one or more regions within the second group of regions is a value larger than zero, and
the value larger than zero is equal between all of the one or more regions within the second group of regions.

2. The dimming device according to claim 1, wherein a voltage applied to a region of the plurality of regions controlled to the first transmittance is substantially constant during the frame period, and a voltage applied to a region of the plurality of regions controlled to the second transmittance is not substantially constant during the frame period.

3. The dimming device according to claim 1, wherein when a voltage amplitude serving as a reference is represented by 1 and a voltage transitioning between −1 and +1 is supplied to each of the column electrode and the row electrode, a variation width of a voltage applied to the one or more regions controlled to the second transmittance is less than 4 at each of a plurality of transition timings.

4. The dimming device according to claim 1, wherein when a voltage amplitude serving as a reference is represented by 1 and a voltage transitioning between −1 and +1 is supplied to each of the column electrode and the row electrode, a variation width of a voltage applied to the one or more regions controlled to the second transmittance is 2 or less at each of a plurality of transition timings.

5. The dimming device according to claim 1, further comprising:
an arithmetic circuit configured to receive a dimming signal specifying a candidate voltage waveform to be supplied to the plurality of column electrodes and a candidate voltage waveform to be supplied to the plurality of row electrodes among a plurality of candidate voltage waveforms, and generate a column control signal and a row control signal according to the dimming signal;
a column electrode drive circuit configured to drive the plurality of column electrodes according to the column control signal; and
a row electrode drive circuit configured to drive the plurality of row electrodes according to the row control signal.

6. The dimming device according to claim 5, wherein
the frame period of the dimming device includes two short frame periods in which polarities of voltage waveforms are inverted,
the arithmetic circuit further generates a polarity signal indicating a polarity of each of the short frame periods, and
the column electrode drive circuit drives the plurality of column electrodes according to the column control signal and the polarity signal, and
the row electrode drive circuit drives the plurality of row electrodes according to the row control signal and the polarity signal.

7. The dimming device according to claim 5, further comprising:
a reference voltage generation circuit configured to generate a reference voltage and supply the reference voltage to each of the column electrode drive circuit and the row electrode drive circuit.

8. The dimming device according to claim 5, wherein the plurality of candidate voltage waveforms corresponds to an orthogonal function.

9. The dimming device according to claim 5, wherein the dimming layer further includes a plurality of second regions partitioned in a matrix,
the dimming panel comprises:
a plurality of second column electrodes that is arranged in the row direction along the front surface of the dimming layer, each of the second column electrodes extending in the column direction; and
a plurality of second row electrodes that faces the plurality of second column electrodes with the plurality of second regions interposed therebetween and is arranged in the column direction along the back surface of the dimming layer, each of the second row electrodes extending in the row direction, and
the dimming device further comprises:
a second column electrode drive circuit configured to drive the plurality of second column electrodes according to the column control signal, and
a second row electrode drive circuit configured to drive the plurality of second row electrodes according to the row control signal.

10. A display device comprising:
a transparent display; and
a dimming device that is arranged on a back surface side of the transparent display and is capable of controlling light transmittance,
the dimming device comprising a dimming panel, the dimming panel comprising:
- a dimming layer that has a plurality of regions partitioned in a matrix;
- a plurality of column electrodes that is arranged in a row direction along a front surface of the dimming layer, each of the column electrodes extending in a column direction; and
- a plurality of row electrodes that faces the plurality of column electrodes with the plurality of regions interposed therebetween and is arranged in the column direction along a back surface of the dimming layer, each of the row electrodes extending in the row direction, wherein:

the dimming panel is capable of controlling a light transmittance to a first transmittance or a second transmittance, during a frame period, each region interposed between the plurality of column electrodes and the plurality of row electrodes are controlled to either the first transmittance or the second transmittance, a first group of regions comprises each region controlled to the first transmittance, a second group of regions comprises each region controlled to the second transmittance, voltages having substantially a same waveform during the frame period are input to a column electrode and a row electrode corresponding to each of one or more regions within the first group of regions, and voltages having waveforms different from each other during the frame period are supplied to a column electrode and a row electrode corresponding to each of one or more regions within the second group of regions, among the plurality of column electrodes and the plurality of row electrodes, during the frame period, an effective voltage applied to the each of the one or more regions within the first group of regions is substantially zero, and an amplitude of an effective voltage applied to the each of the one or more regions within the second group of regions is a value larger than zero, and the value larger than zero is equal between all of the one or more regions within the second group of regions.

11. A method for driving a dimming device including a dimming panel, the dimming panel including: a dimming layer that has a plurality of regions partitioned in a matrix; a plurality of column electrodes that is arranged in a row direction along a front surface of the dimming layer, each of the column electrodes extending in a column direction; and a plurality of row electrodes that faces the plurality of column electrodes with the plurality of regions interposed therebetween and is arranged in the column direction along a back surface of the dimming layer, each of the row electrodes extending in the row direction, wherein the dimming panel is capable of controlling a light transmittance to a first transmittance or a second transmittance, the method comprising:

supplying voltages to the plurality of column electrodes and the plurality of row electrodes, wherein:

during a frame period, each region interposed between the plurality of column electrodes and the plurality of row electrodes are controlled to either the first transmittance or the second transmittance, a first group of regions comprises each region controlled to the first transmittance, a second group of regions comprises each region controlled to the second transmittance, voltages having substantially a same waveform during the frame period are input to a column electrode and a row electrode corresponding to each of one or more regions within the first group of regions, and voltages having waveforms different from each other during the frame period are supplied to a column electrode and a row electrode corresponding to each of one or more regions within the second group of regions, among the plurality of column electrodes and the plurality of row electrodes, during the frame period, an effective voltage applied to the each of the one or more regions within the first group of regions is substantially zero, and an amplitude of an effective voltage applied to the each of the one or more regions within the second group of regions is a value larger than zero, and the value larger than zero is equal between all of the one or more regions within the second group of regions.

12. The method for driving the dimming device according to claim 11, wherein
a voltage applied to a region of the plurality of regions controlled to the first transmittance is substantially constant during the frame period, and a voltage applied to a region of the plurality of regions controlled to the second transmittance is not substantially constant during the frame period.

13. The method for driving the dimming device according to claim 11, wherein
when a voltage amplitude serving as a reference is represented by 1 and a voltage transitioning between −1 and +1 is supplied to each of the column electrode and the row electrode, a variation width of a voltage applied to the one or more regions controlled to the second transmittance is less than 4 at each of a plurality of transition timings.

14. The method for driving the dimming device according to claim 11, wherein
when a voltage amplitude serving as a reference is represented by 1 and a voltage transitioning between −1 and +1 is supplied to each of the column electrode and the row electrode, a variation width of a voltage applied to the one or more regions controlled to the second transmittance is 2 or less at each of a plurality of transition timings.

* * * * *